United States Patent
Gu et al.

(10) Patent No.: US 9,113,164 B1
(45) Date of Patent: Aug. 18, 2015

(54) CONSTANT BIT RATE CONTROL USING IMPLICIT QUANTIZATION VALUES

(75) Inventors: Qunshan Gu, Hayward, CA (US); Wei Jia, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 621 days.

(21) Appl. No.: 13/472,036

(22) Filed: May 15, 2012

(51) Int. Cl.
| | |
|---|---|
| H04N 7/12 | (2006.01) |
| H04N 11/04 | (2006.01) |
| H04N 19/124 | (2014.01) |
| H04N 19/15 | (2014.01) |
| H04N 19/172 | (2014.01) |
| H04N 19/142 | (2014.01) |
| H04N 19/176 | (2014.01) |

(52) U.S. Cl.
CPC ........... *H04N 19/124* (2014.11); *H04N 19/142* (2014.11); *H04N 19/15* (2014.11); *H04N 19/172* (2014.11); *H04N 19/176* (2014.01)

(58) Field of Classification Search
CPC ... H04N 19/124; H04N 19/146; H04N 19/15; H04N 19/172; H04N 19/176
USPC ............. 375/240.03, 240.02, 240.04, 240.05, 375/240.18
See application file for complete search history.

(56) References Cited

U.S. PATENT DOCUMENTS

| | | |
|---|---|---|
| 5,590,329 A | 12/1996 | Goodnow, II et al. |
| 5,644,709 A | 7/1997 | Austin |
| 5,754,742 A | 5/1998 | Astle |
| 5,946,486 A | 8/1999 | Pekowski |
| 6,028,967 A | 2/2000 | Kim et al. |
| 6,085,029 A | 7/2000 | Kolawa et al. |

(Continued)

FOREIGN PATENT DOCUMENTS

| | | |
|---|---|---|
| EP | 1605403 | 12/2005 |
| EP | 2048887 | 4/2009 |
| WO | WO03021969 | 3/2003 |

OTHER PUBLICATIONS

Arbeiter, J. H. et al.; "A Two-Dimensional Real-Time Video Pyramid Processor", RCA Review, RCA Corp. Princeton, US, vol. 47, No. 1, Mar. 1, 1986, pp. 3-31.

(Continued)

*Primary Examiner* — Christopher S Kelley
*Assistant Examiner* — Zhihan Zhou
(74) *Attorney, Agent, or Firm* — Young Basile Hanlon & MacFarlane P.C.

(57) ABSTRACT

Techniques for controlling constant bit rate for a coded video bitstream using implicitly derived quantization values during coding are presented. A decoder component and an encoder component independently track a first subset of quantization-related parameters in relation to coding video frames. The encoder component encodes a macroblock of a video frame using a quantization value based on the first subset of coding parameters and a second subset of coding parameters. The decoder component calculates the quantization value for the macroblock based on the first subset and second subset of quantization-related parameters, the second subset received in a header with the bitstream. The decoder component uses calculated quantization values to adjust quantization levels in relation to decoding macroblocks of a frame to facilitate maintaining constant bit rate control for the bitstream. The second subset of quantization-related parameters includes parameter information other than explicit quantization change information.

2 Claims, 9 Drawing Sheets

(56) References Cited

U.S. PATENT DOCUMENTS

| | | |
|---|---|---|
| 6,243,416 B1 | 6/2001 | Matsushiro et al. |
| 6,263,114 B1 | 7/2001 | Saunders |
| 6,363,119 B1 | 3/2002 | Oami |
| 6,434,197 B1 | 8/2002 | Wang et al. |
| 6,473,460 B1 | 10/2002 | Topper |
| 6,532,306 B1 | 3/2003 | Boon et al. |
| 6,542,990 B1 | 4/2003 | Tremblay et al. |
| 6,681,299 B1 | 1/2004 | Shimamura et al. |
| 6,687,304 B1 | 2/2004 | Peng |
| 6,700,809 B1 | 3/2004 | Ng et al. |
| 7,114,104 B1 | 9/2006 | Bennett |
| 7,185,125 B2 | 2/2007 | Rougnon-Glasson |
| 7,216,135 B2 | 5/2007 | Sawdon et al. |
| 7,218,674 B2 | 5/2007 | Kuo |
| 7,236,527 B2 | 6/2007 | Ohira |
| 7,253,831 B2 | 8/2007 | Gu |
| 7,263,125 B2 | 8/2007 | Lainema |
| 7,450,642 B2 | 11/2008 | Youn |
| 7,457,362 B2 | 11/2008 | Sankaran |
| 7,487,314 B1 | 2/2009 | Agesen et al. |
| 7,681,077 B1 | 3/2010 | Eitzmann et al. |
| 7,734,893 B2 | 6/2010 | Hattori et al. |
| 7,768,515 B1 | 8/2010 | Eitzmann et al. |
| 7,836,434 B1 | 11/2010 | Boucher |
| 7,856,538 B2 | 12/2010 | Speirs, II et al. |
| 8,311,111 B2 | 11/2012 | Xu et al. |
| 8,325,796 B2 | 12/2012 | Wilkins et al. |
| 8,526,498 B2 | 9/2013 | Lim et al. |
| 8,666,181 B2 | 3/2014 | Venkatapuram et al. |
| 8,711,935 B2 | 4/2014 | Kim et al. |
| 2002/0131512 A1* | 9/2002 | Boroczky et al. ........ 375/240.29 |
| 2003/0053541 A1 | 3/2003 | Sun et al. |
| 2003/0072364 A1 | 4/2003 | Kim et al. |
| 2003/0140238 A1 | 7/2003 | Turkboylari |
| 2004/0013202 A1* | 1/2004 | Lainema ................. 375/240.18 |
| 2004/0114568 A1 | 6/2004 | Beverly |
| 2004/0234150 A1* | 11/2004 | Chang ........................... 382/251 |
| 2005/0265447 A1 | 12/2005 | Park |
| 2005/0283770 A1 | 12/2005 | Karp et al. |
| 2006/0277371 A1 | 12/2006 | Cohn et al. |
| 2007/0065026 A1 | 3/2007 | Lee et al. |
| 2007/0156986 A1 | 7/2007 | Neiger et al. |
| 2007/0157124 A1 | 7/2007 | Haug |
| 2007/0223576 A1* | 9/2007 | Tan et al. ................. 375/240.03 |
| 2007/0268964 A1 | 11/2007 | Zhao |
| 2008/0013844 A1 | 1/2008 | Hu |
| 2008/0225947 A1 | 9/2008 | Narroschke et al. |
| 2008/0232459 A1* | 9/2008 | Auyeung ................. 375/240.01 |
| 2008/0240250 A1 | 10/2008 | Lin et al. |
| 2009/0043978 A1 | 2/2009 | Sawdon et al. |
| 2010/0086028 A1 | 4/2010 | Tanizawa et al. |
| 2010/0086032 A1* | 4/2010 | Chen et al. ............... 375/240.12 |
| 2010/0104021 A1 | 4/2010 | Schmit |
| 2010/0118945 A1 | 5/2010 | Wada et al. |
| 2010/0128796 A1 | 5/2010 | Choudhury |
| 2010/0166061 A1* | 7/2010 | Kondo et al. ............ 375/240.03 |
| 2010/0177819 A1 | 7/2010 | Jeon et al. |
| 2010/0260268 A1 | 10/2010 | Cowan et al. |
| 2010/0322306 A1 | 12/2010 | Au et al. |
| 2011/0026591 A1 | 2/2011 | Bauza et al. |
| 2011/0038410 A1 | 2/2011 | Narroschke et al. |
| 2011/0173505 A1 | 7/2011 | Bae et al. |
| 2011/0235706 A1 | 9/2011 | Demircin et al. |
| 2011/0293001 A1 | 12/2011 | Lim et al. |
| 2011/0304634 A1 | 12/2011 | Urbach |
| 2012/0170647 A1 | 7/2012 | He et al. |
| 2012/0278665 A1 | 11/2012 | Serebryany et al. |

OTHER PUBLICATIONS

Schrieber W.F.; "Advanced Television Systems for Terrestrial Broadcasting: Some Problems and Some Proposed Solutions", Proceedings of the IEEE, IEEE New York, US, vol. 83, No. 6, Jun. 1, 1995, pp. 958-981.

Zhao, Qin, et al.; "Efficient Memory Shadowing for 64-bit Architectures", Procedings of the 2010 International Symposium of Memory Management, Jun. 5, 2010, pp. 93-102.

Bankoski, et al., "Technical Overview of VP8, an Open Source Video Codec for the Web," 6 pages.

Mozilla, "Introduction to Video Coding," 171 pages.

Cassidy, "An Analysis of VP8, a New Video Codec for the Web," 148 pages.

Pai, et al., "MPEG-4 constant-quality constant-bit-rate control algorithms," Signal Processing: Image Communication, Jan. 2006, vol. 21, Issue 1, pp. 67-89.

Bankoski et al. "Technical Overview of VP8, An Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Chee, Y-K.; "Survey of Progressive Image Transmission Methods", International Journal of Imaging Systems and Technology, Wiley and Sons, New York, US, vol. 10, No. 1, Jan. 1, 1999, pp. 3-19.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Jun-Ren Ding et al.; "Two-Layer and adaptive entropy coding algorithms for H. 264-based lossless image coding", Acoustics, Speech and Signal Processing, 2008. ICASSP 2008. IEE International conference on IEEE, Piscatawa, NJ, USA Mar. 31, 2008.

Overview; VP7 Data Format and Decoder. Version 1.5. On2 Technologies, Inc. Dated Mar. 28, 2005.

Park, Jun Sung, et al., "Selective Intra Prediction Mode Decision for H.264/AVC Encoders", World Academy of Science, Engineering and Technology 13, (2006).

Price, Thomas B.; "Muscle and Liver Carbohydrates: Response to Military Task Performance by Women and Men", Oct. 1, 1997, http://www.dtic.mil/docs/citations/ADA337501, p. 10.

Schwarz H. et al.: "SNR-scalable extension of H.264/AVC", Image Processing, 2004. ICIP 2004 International Conference on Singapore Oct. 24-27, 2004.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May, 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

(56) References Cited

OTHER PUBLICATIONS

Shimono et al.; "Transform Image Coding With Edge Compensation", Electronics and Communications in Japan, Part I: Communications, Hoboken, NJ, US, vol. 74, No. 10, Oct. 1, 1991, pp. 49-56.

VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.

* cited by examiner

CONSTANT BIT RATE CONTROL USING IMPLICIT QUANTIZATION VALUES

TECHNICAL FIELD

This disclosure relates generally to video processing, and more specifically to controlling constant bit rate using implicit quantization values.

BACKGROUND

The amount of data representing media information, such as a still image and video image, can be extremely large. Further, transmitting digital video information over communication networks can consume large amounts of bandwidth. The cost of transmitting data from one location to another can be a function of number of bits transmitted per second. Typically, higher bit transfer rates are associated with increased cost. Higher bit rates also can progressively add to required storage capacities of memory systems, which can thereby increase storage cost. Thus, at a given quality level, it can be much more cost effective to use fewer bits, as opposed to more bits, to store digital images and videos. It therefore can be desirable to compress media data for recording, transmitting, or storing.

For a typical compression scheme, achieving higher media quality can require that more bits be used, which can, in turn, increase cost of transmission and/or storage. While lower bandwidth traffic may be desired so may higher quality media.

An encoder is a device capable of encoding (e.g., coding), and sometimes also decoding, digital media data. A decoder is a device capable of decoding digital media data. A codec is a device capable of coding and/or decoding digital media data. The term codec is derived from a combination of the terms code and decode, or the terms compress and decompress. A variety of codecs are commercially available. An encoder or codec, by encoding the digital media data, can reduce the number of bits required to transmit signals, which can thereby reduce associated transmission costs.

Constant bit rate (CBR) control can be desirable in video compression coding, particularly with regard to real-time, bandwidth-limited applications, such as video conferencing and video chat applications. CBR control can be useful for coding in relation to video streaming where it can be desirable to stream media content at a predictable bit rate using a consistent amount of bandwidth. Bit rate control can be achieved, for example, by changing the quantization value from time to time during the video compression encoding process. Some conventional systems control quantization to frame level or slice/segment level. However, this often cannot achieve an adequate constant bit rate. Certain conventional codec designs, such as MPEG-2, H.263 and H.264, employ macroblock-level quantization control to achieve CBR. These conventional codec designs control CBR by explicitly carrying the quantization change information (e.g., quantization value or quantization adjustment value) in the bitstream. However, this quantization change information typically can use a substantial amount of bits.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to coding (e.g., encoding, decoding) video content. Disclosed herein is a system for decoding a coded video bitstream. The system can include a decoder component configured to receive the coded video bitstream comprising a video frame sequence, and decode a current macroblock of a current video frame of the video frame sequence, based at least in part on a quantization value. The system also can include a decoder management component configured to track a first subset of quantization-related parameters during decoding of macroblocks of the current video frame and identify the quantization value for use in facilitating decoding the current macroblock, based at least in part on the first subset of quantization-related parameters and a second subset of quantization-related parameters, to facilitate implicitly controlling quantization values in relation to decoding the current video frame to maintain constant bit rate control for the coded video bitstream, wherein the second subset of quantization-related parameters is obtained by the decoder management component from a header that is associated with the current video frame and received with the coded video bitstream.

Also disclosed herein is a method for encoding video content. The method includes employing at least one processor to facilitate execution of code instructions retained in at least one memory device. The at least one processor, in response to execution of the code instructions, performs acts comprising: tracking a first subset of quantization-related parameters during decoding of macroblocks of a current video frame associated with the coded video bitstream; and identifying a quantization value for use in facilitating decoding a current macroblock of the current video frame, based at least in part on the first subset of quantization-related parameters and a second subset of quantization-related parameters, to facilitate implicitly controlling quantization values in relation to decoding the current video frame to maintain constant bit rate control in relation to the coded video bitstream, wherein the second subset of quantization-related parameters is obtained from a header associated with the current video frame and received with the coded video bitstream.

Further disclosed herein is a system for decoding a coded video bitstream. The system can include means for tracking a first subset of quantization-related parameters during decoding of macroblocks of a current video frame associated with the coded video bitstream. The system also can contain means for identifying a quantization value for use in facilitating decoding a current macroblock of the current video frame, based at least in part on the first subset of quantization-related parameters and a second subset of quantization-related parameters, to facilitate implicitly controlling quantization values in relation to decoding the current video frame to maintain constant bit rate control in relation to the coded video bitstream, wherein the second subset of quantization-related parameters is obtained from a header that is associated with the current video frame and received with the coded video bitstream.

Also disclosed herein is a system for encoding video frames. The system can include an encoder component configured to encode macroblocks of video frames of a video frame sequence to generate a coded video bitstream, the encoder component configured to encode a current macroblock of a current video frame of the video frame sequence based at least in part on a quantization value. The system also includes an encoder management component configured to track a first subset of quantization-related parameters during encoding of macroblocks of the current video frame and identify the quantization value for use in relation to encoding the current macroblock, based at least in part on the first subset of quantization-related parameters and a second subset of quantization-related parameters, to facilitate implicitly controlling quantization values in relation to encoding the current video frame to maintain constant bit rate control for the coded video bitstream, wherein the second subset of quantization-related parameters includes quantization-related parameters applicable to the current video frame.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
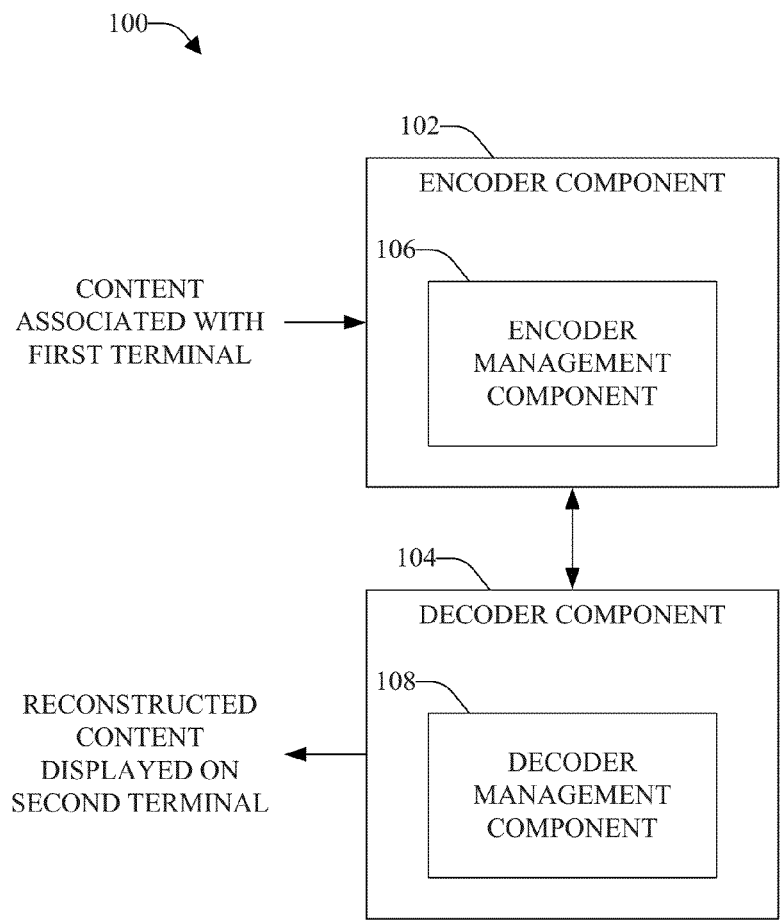
FIG. 1 illustrates a block diagram of an example system that can implicitly control quantization levels in relation to coding video content to maintain a desired constant bit rate, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

An encoder is a device capable of encoding (e.g., coding) (and sometimes decoding) digital media data. A decoder is a device capable of decoding digital media data. Encoding digital media data can involve compressing the digital media data, and decoding of encoded digital media data can involve decompressing the encoded digital media data. A codec is a device capable of coding and/or decoding digital media data.

In video compression coding, constant bit rate control can be desirable, particularly with regard to real-time, bandwidth-limited applications, such as video conferencing and video chat applications. Constant bit rate control can be useful for coding in relation to video streaming where it can be desirable to stream media content at a predictable bit rate using a consistent amount of bandwidth. Bit rate control can be achieved by changing the quantization value (e.g., based at least in part on the content of the video frame) at given times during the transmission of the bitstream. Some conventional systems control quantization to frame level or slice/segment level. However, this often cannot achieve an adequate constant bit rate. Certain conventional codec designs, such as MPEG-2, H.263 and H.264, employ macroblock-level quantization control to achieve a constant bit rate. These conventional codec designs control constant bit rate by explicitly carrying the quantization change information, such as a quantization value or quantization adjustment value, in the bitstream. However, this quantization change information typically can use a substantial amount of bits. As a result, such conventional codec designs can be inefficient, due to the substantial overhead being used in relation to carrying this quantization change information in the coded transmission, which thereby can reduce the amount of bit rate that is available to transmit coded video content.

To that end, techniques for implicitly controlling quantization values (e.g., dynamically) to facilitate maintaining a constant bit rate (e.g., in real time) and coding of video content are presented. A decoder component can include a decoder management component and an encoder component can include an encoder management component that, respectively, can implicitly control quantization values to a macroblock level of granularity (e.g., control quantization value for each macroblock) to maintain a constant bit rate (e.g., in real time) in relation to coding of video content. The decoder management component and encoder management component each can independently track a first subset of quantization-related parameters in relation to coding of video frames associated with a coded video bitstream being communicated between the encoder component and decoder component. The first subset of quantization-related parameters can include, for example, the actual number of bits spent in relation to coding of a current macroblock, the accumulated number of bits spent for coding the coded macroblocks of a current video frame, and/or the accumulated bit spending deficit for the current video frame after coding a current macroblock, etc. The decoder management component and encoder management component each can use a defined coding algorithm(s) to facilitate tracking the first subset of quantization-related parameters.

The encoder component can encode a current macroblock of a current video frame using a quantization value that can be determined as a function of the first subset of quantization-related parameters and a second subset of quantization-related parameters, in accordance with the defined coding algorithm(s). In some implementations, the encoder management component can include the second subset of quantization-related parameters in a header (e.g., frame or picture header) associated with the coded video bitstream being transmitted to the decoder component. The second subset of quantization-related parameters can include a bit budget for the current video frame, a starting quantization value of the current video frame, a bit spending deficit threshold level for use in determining whether to increase a quantization value, a bit spending surplus maximum threshold level for use in determining whether to decrease a quantization value. The second subset of quantization-related parameters also can include a maximum threshold quantization value allowed for the current video frame, a minimum threshold quantization value allowed for the current video frame, etc. The second subset of quantization-related parameters further can include other parameter information, but does not have to include quantization change information (e.g., quantization value, quantization adjustment value). The coded video bitstream and associated information (e.g., information in the header) can be transmitted to the decoder component via a desired communication channel.

The decoder component can receive the coded video bitstream and the second subset of quantization-related parameters. The decoder component can decode macroblocks of video frames carried in the coded video bitstream. The decoder management component can implicitly control a quantization value (e.g., dynamically) used for each macroblock during decoding of macroblocks of a video frame based at least in part on the first subset of quantization-related parameters (as tracked by the decoder management component) and the second subset of quantization-related parameters.

During decoding of a current macroblock of the current video frame of the coded video bitstream, the decoder management component can identify or calculate a quantization value to use in relation to decoding of the current macroblock as a function of the first subset of quantization-related parameters and the second subset of quantization-related parameters. The decoder management component can use the defined coding algorithm to facilitate identifying or calculating the quantization value to use for the current macroblock.

The decoder management component can identify and use respective calculated quantization values to adjust quantization values in relation to respective macroblocks of a current video frame to facilitate maintaining constant bit rate control in relation to the video frame sequence. Since the encoder component does not have to include explicit quantization change information in the coded video bitstream communicated to the decoder component, there can be a reduction in the amount of bit rate used in relation to the coded video bitstream (e.g., as compared to conventional codecs). At the same time, the encoder and decoder components can respectively operate to implicitly control quantization values using the tracked first subset of quantization-related parameters and the second subset of quantization-related parameters to facilitate controlling quantization to maintain a desired constant bit rate. This implicit quantization control can facilitate maintaining video quality such that video quality can be at least at the quality level provided by conventional codec designs.

In some implementations, a video frame can be divided into multiple slices or segments. The encoder management component and decoder management component can use a similar defined coding algorithm(s) as that described with regard to coding of macroblocks of an entire video frame, except that the defined coding algorithm(s), parameter values, and/or communication of parameters can be modified to account for the video frame being divided into multiple slices or segments. For example, the encoder management component can transmit a second subset of quantization-related parameters in a slice header or segment header in relation to a coded video bitstream. The decoder management component can receive the slice header or segment header and can obtain the second subset of quantization-related parameters from the header. The parameters values of the respective parameters in the second subset can be set or modified as desired to account for (e.g., compensate for) the video frame being divided into a slice or segment. The encoder management component and decoder management component can each identify a quantization value to use to implicitly control quantization for each macroblock of a slice or segment, based at least in part on the second subset of quantization-related parameters and a tracked first subset of quantization-related parameters, in accordance with the modified coding algorithm.

In certain implementations, a codec can use a different partition of a video bitstream to carry, for example, overhead information relating to motion vector, mode, or other overhead information, while carrying residual coding in a separate partition of the video bitstream. In such implementations, the encoder component and decoder component can already know such overhead information, e.g., before coding the residual error. In such instances, it can be more desirable and/or accurate for the encoder and decoder components to deduct the overhead bits (e.g., bits relating to overhead information) from the frame bit budget and apply the deducted frame bit budget to control residual error coding. It also can or may be desirable for the encoder and decoder components to adjust threshold information (e.g., bit spending deficit maximum threshold level, bit spending surplus maximum threshold level, etc.) associated with the defined coding algorithm(s) to reflect the definition change.

Referring now to the drawings, FIG. 1 illustrates a block diagram of an example system 100 that can implicitly control quantization levels in relation to coding video content to maintain a desired constant bit rate, in accordance with various aspects and implementations described herein. The system 100 can be used to code video content (e.g., digital video data), for example, associated with applications, including real-time and/or bandwidth-limited applications, such as, for example, a video conferencing application, a video chat application, or other live streaming applications, where constant bit rate control can be desirable.

The system 100 can include an encoder component 102 that encodes received or captured video content to produce encoded video content as an output. The encoder component 102 can encode or compress the video content in accordance with a defined compression or encoding algorithm(s). The encoder component 102 can be a stand-alone unit, part of a codec, part of another component or unit, or can have portions of the encoder component 102 distributed in multiple components or units of the system 100.

The system 100 also can include a decoder component 104 that decodes received encoded video content to produce decoded or reconstructed video content as an output (e.g., for presentation on a display screen). The decoder component 104 can decode or decompress the encoded video content in accordance with a defined decompression or decoding algorithm(s), which can correspond to the algorithm(s) used to encode the video content. The decoder component 104 can be a stand-alone unit, part of a codec, part of another component or unit, or can have portions of the decoder component 104 distributed in multiple components or units of the system 100.

The encoder component 102 and decoder component 104 can control coding of video content, and also can implicitly control quantization values associated with coding of macroblocks of video frames to facilitate obtaining and maintaining desired constant bit rate control for the coded video bitstream. To facilitate controlling coding, the encoder component 102 can include an encoder management component 106, and the decoder component 104 can include a decoder management component 108.

The encoder management component 106 and decoder management component 108, respectively, can implicitly and/or dynamically control quantization values on a macroblock level (e.g., for each macroblock) to control constant bit rate (e.g., in real time) to facilitate maintaining a desired constant bit rate in relation to coding of video content. During coding of a current video frame, the encoder management component 106 and decoder management component 108 each can independently track a first subset of quantization-related parameters in relation to coding of macroblocks of the current video frame associated with a coded video bitstream being communicated between the encoder component 102 and decoder component 104. The first subset of quantization-related parameters can include, for example, the actual number of bits spent in relation to coding of a current macroblock of a current video frame in the sequence, the accumulated number of bits spent for coded macroblocks of the current video frame, and/or the accumulated bit spending deficit associated with the current video frame after the coding of the current macroblock, etc. In some implementations, the encoder management component 106 and decoder management component 108 each can use a defined coding algorithm(s) to facilitate tracking the first subset of quantization-related parameters.

When encoding the current video frame, the encoder management component 106 also can identify a second subset of quantization-related parameters, based at least in part on defined coding criterion. The encoder management component 106 can insert the second subset of quantization-related parameters into a header (e.g., frame or picture header). The encoder component 102 can transmit the header with the second subset of quantization-related parameters, in relation to transmission of the coded video bitstream, to the decoder component 104. The second subset of quantization-related parameters can include a bit budget for the current video frame, the starting quantization value of the current video frame, and/or the quantization value (e.g., starting quantization value) for the first macroblock of the current video frame to be encoded. The second subset of quantization-related parameters also can include the bit spending threshold deficit level to use in determining whether to increase a quantization value in relation to coding a macroblock and/or a bit spending threshold surplus level to use in determining whether to decrease a quantization value in relation to coding a macroblock. The second subset of quantization-related parameters also can include a maximum threshold quantization value allowed for the current video frame and/or a minimum threshold quantization value allowed for the current video frame. The second subset of quantization-related parameters can include other types of parameter information, but does not include explicit quantization change information (e.g., quantization value (e.g., except for the starting quantization value for the first macroblock), quantization adjustment value, etc.).

In some implementations, the encoder component 102 can have the information indicating the total number of macroblocks of the current video frame carried in the coded video bitstream or header (e.g., picture or frame header). In other implementations, the decoder management component 108 can derive (e.g., calculate) the total number of macroblocks of the current video frame based at least on other parameters carried in the coded video bitstream.

The encoder management component 106 also can set initial parameter values, in accordance with the defined coding algorithm. For example, the encoder management component 106 can set the quantization value for the first macroblock of the current video frame to the identified starting quantization value associated with the current video frame, and the accumulated number of bits spent to code the current video frame to a defined value (e.g., 0 in relation to the first macroblock). The encoder management component 106 also can identify or calculate the expected or average number of bits to be spent for coding each macroblock. In some implementations, the encoder management component 106 can calculate the expected or average number of bits to be spent for coding a macroblock as a function of the bit budget and the total number of macroblocks of the current video frame (e.g., the bit budget divided by the total number of macroblocks).

For each macroblock of the current video frame, the encoder component 102 can encode a current macroblock (e.g., starting with the first macroblock selected for encoding) based at least in part on the first subset of quantization-related parameters and the second subset of quantization-related parameters. The encoder management component 106 can track the first subset of quantization-related parameters, for example, by tracking respective parameter values after encoding the current macroblock of the current video frame. The encoder management component 106 can use the tracked information relating to the first subset of quantization-related parameters to facilitate controlling (e.g., identifying or adjusting) a quantization value to use for encoding the next macroblock of the current video frame, in accordance with defined coding criterion and the defined coding algorithm(s).

After encoding the current macroblock, the encoder management component 106 can identify the actual number of bits spent on coding (e.g., encoding) the current macroblock. In accordance with the defined coding algorithm, the encoder management component 106 can identify or calculate the bit total, e.g., the accumulated number of bits used for coding the coded macroblocks of the current video frame after coding of the current macroblock. The encoder management component 106 can identify or calculate the bit total as a function of the actual number of bits spent on coding the current macroblock. For example, the encoder management component 106 can calculate the current bit total for the current video frame by adding the actual number of bits spent on coding the current macroblock to the previous bit total of the accumulated number of bits used for coding previously coded macroblocks of the current video frame prior to coding the current macroblock.

In accordance with the defined coding algorithm, the encoder management component 106 also can identify or calculate the current total bit deficit, e.g., the accumulated bit spending deficit for the current video frame after coding the current macroblock. The encoder management component 106 can calculate the current total bit deficit as a function of the current bit total for the current video frame and the number of bits expected to have been spent for coding the macroblock(s) of the current video frame that have been coded. For example, the encoder management component 106 can calculate the current total bit deficit as the current bit total for the current video frame minus the number of bits expected to have been spent for coding the macroblock(s) of the current video frame that have been coded (e.g., current bit total−(number of coded blocks of current video frame)*(bit budget/total number of macroblocks of the current video frame)).

In accordance with the defined coding algorithm, the encoder management component 106 can determine whether the current total bit deficit is greater than the bit spending deficit threshold level for quantization applicable in relation to the current video frame. If the encoder management component 106 determines the current total bit deficit associated with the current macroblock is greater than the applicable bit spending deficit threshold level, the encoder management component 106 can determine, at least preliminarily, that the current quantization value is to be adjusted (e.g., increased) by a defined amount (e.g., 1) to generate a preliminary next quantization value in relation to coding the next macroblock.

In accordance with the defined coding algorithm, the encoder management component 106 can determine whether the current total bit deficit is less than the inverse of the bit spending surplus threshold level for quantization value decrease that is applicable in relation to the current video frame, for example, if it is determined that the current total bit deficit is not greater than the applicable bit spending deficit threshold level for quantization value increase. For example, the encoder management component can determine whether (the current total bit deficit)<−(the bit spending surplus threshold level). Alternatively, the encoder management component 106 can determine that the current total bit surplus is equal to −(the current total bit deficit), and can determine whether (the current total bit surplus)>(the bit spending surplus threshold level). If the encoder management component 106 determines the current total bit deficit associated with the current macroblock is less than the inverse of the bit spending surplus threshold level or, alternatively, the current total bit surplus is greater than the bit spending surplus threshold level, the encoder management component 106 can determine, at least preliminarily, that the current quantization value is to be adjusted. For instance, the encoder management component 106 can determine, at least preliminarily, that the current quantization value is to be adjusted (e.g., decreased) by a defined amount (e.g., 1) to generate a preliminary next quantization value in relation to coding the next macroblock.

In accordance with the defined coding algorithm, if the encoder management component 106 determines that the current total bit deficit is less than or equal to the bit spending threshold deficit level and is greater than or equal to the inverse of the bit spending threshold surplus level, the encoder management component 106 can determine the current quantization value is to be maintained at the same value for the next macroblock to be coded. In some implementations, if the encoder management component 106 determines the current quantization value can be maintained at the same quantization value, the encoder management component 106 can set the next quantization value as the current quantization value without comparing the next quantization value to the maximum or minimum threshold quantization values, since the quantization value is unchanged.

In accordance with the defined coding algorithm, the encoder management component 106 also can determine whether a preliminary next quantization value (e.g., preliminarily adjusted quantization value) is to be used as a next quantization value in relation to encoding a next macroblock of the current video frame. The encoder management component 106 can determine whether the preliminary next quantization value is greater than the maximum threshold quantization value allowed for the current video frame. If the encoder management component 106 determines the preliminary next quantization value is greater than the maximum threshold quantization value allowed for the current video frame, the encoder management component 106 can adjust the preliminary next quantization value to generate a next quantization value that is to the maximum threshold quantization value. The encoder management component 106 can use this next quantization value for encoding the next macroblock of the current video frame.

The encoder management component 106 can determine whether the preliminary next quantization value is less than the minimum threshold quantization value allowed for the current video frame, for example, if it is determined that the preliminary next quantization value is not greater than the maximum threshold quantization value allowed for the current video frame. If the encoder management component 106 determines the preliminary next quantization value is less than the minimum threshold quantization value allowed for the current video frame, the encoder management component 106 can adjust the preliminary next quantization value to generate a next quantization value that is equal to the minimum threshold quantization value. The encoder management component 106 can use this next quantization value for encoding the next macroblock of the current video frame.

The encoder component 102 can transmit the coded video bitstream (e.g., encoded portions of the video content) to the decoder component 104. The encoder component 102 also can transmit information, such as the second subset of quantization-related parameters, relating to the encoded video bitstream to the decoder component in relation to transmitting the coded video bitstream to the decoder component 104.

The decoder component 104 can receive the coded video bitstream and the second subset of quantization-related parameters from the encoder component 102. The decoder management component 108 can control decoding of the encoded video content using the defined coding algorithm(s), based at least in part on the defined coding criterion.

During decoding of a current macroblock of the current video frame of the coded video bitstream, the decoder management component 108 can identify or calculate a quantization value to use in relation to decoding the current macroblock as a function of the first subset of quantization-related parameters (as tracked by the decoder management component 108) and the second subset of quantization-related parameters. The decoder management component 108 can use the defined coding algorithm(s) to facilitate identifying or calculating the quantization value to use in relation to decoding the macroblock.

In relation to a current video frame, the decoder management component 108 can identify and/or set initial parameter values (e.g., for use in accordance with the defined coding algorithm(s)) to facilitate decoding of the current video frame (e.g., including the first macroblock), based at least in part on the second subset of quantization-related parameters received in relation to the current video frame. In relation to the current video frame, the initial parameter values can include, for example, the starting quantization value of the current video frame (e.g., for use in decoding the first macroblock), the bit spending deficit threshold level for quantization value increase, the bit spending surplus threshold level for quantization value decrease, the maximum quantization threshold value allowable, and/or the minimum quantization threshold value allowable. The decoder management component 108 also can initially set the initial accumulated bit total for the current video frame to a defined value (e.g., 0).

The decoder management component 108 also can identify the total number of macroblocks in the current video frame from explicit parameter information (e.g., a total-macroblocks-of-frame parameter) carried in the coded video bitstream, or can derive (e.g., calculate) the total number of macroblocks in the current video frame based at least in part on other parameters carried in the bitstream. The decoder management component 108 can identify or calculate the expected or average number of bits to be spent per block as a function of the bit budget and the total number of macroblocks of the current video frame (e.g., as the bit budget divided by the total number of macroblocks of the current video frame). The decoder management component 108 can use the information relating to the expected or average number of bits to be spent per block, for example, to facilitate determining the accumulated or total bit spending deficit of the current video frame at desired times (e.g., after coding a current macroblock).

During the decoding process associated with the current video frame, the decoder management component 108 can track information relating to the first subset of quantization-related parameters (e.g., track respective parameter values after decoding a current macroblock of the current video frame). The decoder management component 108 can use the tracked information relating to the first subset of quantization-related parameters to facilitate controlling (e.g., identifying or adjusting) a quantization value to use for decoding the next macroblock(s) of the current video frame, in accordance with defined coding criterion and the defined coding algorithm(s).

After decoding the current macroblock, the decoder management component 108 can identify the actual number of bits spent in relation to coding the current macroblock. In accordance with the defined coding algorithm, the decoder management component 108 can identify or calculate the current bit total, e.g., the accumulated number of bits used in relation to coding the current video frame after coding of the current macroblock. The decoder management component 108 can identify or calculate the current bit total as a function of the actual number of bits spent in relation to coding the current macroblock. For example, the decoder management component 108 can calculate the current bit total for the current video frame by adding the actual number of bits spent on coding the current macroblock to the previous bit total of the accumulated number of bits used for coding previously coded macroblocks of the current video frame prior to coding the current macroblock.

In accordance with the defined coding algorithm, after decoding the current macroblock, the decoder management component 108 also can identify or calculate the current total bit deficit, e.g., the accumulated bit spending deficit for the current video frame after the decoding of the current macroblock. The decoder management component 108 can identify or calculate the current total bit deficit as a function of the current bit total for the current video frame and the number of bits expected to have been spent in relation to coding the macroblock(s) of the current video frame that have been decoded. For example, the decoder management component 108 can calculate the current total bit deficit as the current bit total for the current video frame minus the number of bits that were expected to have been spent in relation to coding the macroblock(s) of the current video frame that have been decoded (e.g., current bit total–(number of decoded blocks of current video frame)*(bit budget/total number of macroblocks of the current video frame)). To facilitate calculating the current total bit deficit, the decoder management component 108 also can calculate the expected number of bits spent to code all of the macroblocks of the current video frame that have been decoded as a function of the bit budget associated with the current video frame, the total number of macroblocks in the current video frame, and the number of macroblocks of the current video frame that have been decoded (e.g., (number of decoded blocks of current video frame)*(bit budget/total number of macroblocks of the current video frame)).

In accordance with the defined coding algorithm, the decoder management component 108 can determine whether the current total bit deficit is greater than the bit spending deficit threshold level for quantization value increase applicable in relation to the current video frame. If the decoder management component 108 determines the current total bit deficit associated with the current macroblock is greater than the applicable bit spending deficit threshold level for quantization value increase, the decoder management component 108 can determine, at least preliminarily, that the current quantization value is to be adjusted (e.g., increased) by a defined amount (e.g., 1) to generate a preliminary next quantization value in relation to decoding the next macroblock.

In accordance with the defined coding algorithm, the decoder management component 108 also can determine whether the current total bit deficit is less than the inverse of the bit spending surplus threshold level for quantization value decrease, for example, if it is determined that the current total bit deficit associated with the current macroblock is not greater than the bit spending deficit threshold level for quantization value decrease. In some instances, as desired, the decoder management component 108 can identify a current total bit surplus as being the inverse of (e.g., the negative of) the current total bit deficit. In such instances, the decoder management component 108 can determine whether the current total bit surplus is greater than the bit spending surplus threshold level for quantization value decrease, which is applicable to the current video frame. If the decoder management component 108 determines the current total bit deficit associated with the current macroblock is less than the inverse of the bit spending surplus threshold level or, alternatively, the current total bit surplus is greater than the bit spending surplus threshold level, the decoder management component 108 can determine, at least preliminarily, that the current quantization value is to be adjusted. For instance, the decoder management component 108 can determine, at least preliminarily, that the current quantization value is to be adjusted (e.g., decreased) by a defined amount (e.g., 1) to generate a preliminary next quantization value in relation to decoding the next macroblock.

In accordance with the defined coding algorithm, if the decoder management component 108 determines that the current total bit deficit is less than or equal to the bit spending threshold deficit level and is greater than or equal to the inverse of the bit spending surplus threshold level, the decoder management component 108 can determine the current quantization value is to be maintained at the same value for the next macroblock to be decoded. In some implementations, when the decoder management component 108 determines the current quantization value can be maintained at the same quantization value, the decoder management component 108 can set the next quantization value as the current quantization value without comparing the next quantization value to the maximum or minimum threshold quantization values, since the quantization value is unchanged.

In accordance with the defined coding algorithm (e.g., when the quantization value is being adjusted from a current quantization value), the decoder management component 108 can determine whether a preliminary next quantization value (e.g., preliminarily adjusted quantization value) is to be used as a next quantization value in relation to decoding a next macroblock of the current video frame. The decoder management component 108 can determine whether the preliminary next quantization value is greater than the maximum threshold quantization value allowed for the current video frame. If the decoder management component 108 determines the preliminary next quantization value is greater than the maximum threshold quantization value allowed for the current video frame, the decoder management component 108 can adjust the preliminary next quantization value to generate a next quantization value that is equal to the maximum threshold quantization value. The decoder management component 108 can use this next quantization value for decoding the next macroblock of the current video frame.

The decoder management component 108 also can determine whether the preliminary next quantization value is less than the minimum threshold quantization value allowed for the current video frame, for example, if it is determined that the preliminary next quantization value is not greater than the maximum threshold quantization value allowed for the current video frame. If the decoder management component 108 determines the preliminary next quantization value is less than the minimum threshold quantization value allowed for the current video frame, the decoder management component 108 can adjust the preliminary next quantization value to generate a next quantization value that is equal to the minimum threshold quantization value. The decoder management component 108 can use this next quantization value in relation to decoding the next macroblock of the current video frame.

In some implementations, the encoder management component 106 and decoder management component 108 can implicitly control quantization levels in relation to coding of macroblocks of a video frame to facilitate controlling the bit rate to maintain a desired constant bit rate, in accordance with the following pseudo-code, which contains an example defined coding algorithm:

(1) Definition
Bit_Budget: the bit budget for the current video frame;
StartQ: the starting quantization value of the current video frame;
Q_MB[i]: the quantization value of Macroblock i;
Bit_Deficit_Threshold: bit spending deficit level for Quantization value increase;
Bit_Surplus_Threshold: bit spending surplus level for Quantization value decrease;
MaxQ: maximum quantization value allowed for this frame
MinQ: minimum quantization value allowed for this frame
//The above parameters (e.g., second subset of quantization-related parameters) can be carried in the header (e.g., picture or frame header, slice header, segment header, etc.) for the decoder component to use to calculate the quantization value.//
N_MB: total number of macroblocks in the frame;
//This information relating to the total number of macroblocks in the current video frame already can be carried in the coded video bitstream or can be calculated using other parameters carried in the bitstream.//
Bits_MB[i]: the actual bit spending of macroblock i;
//The encoder component and decoder component can track the Bits_MB[i] parameter after the encoding or decoding for each macroblock.//
Bit_Total[i]: the accumulated bits from macroblock 0 to macroblock i;
// The encoder component and decoder component can track the Bit_Total[i] parameter after encoding and decoding for each macroblock.//
Bits_Deficit[i]: the accumulated bit spending deficit after macroblock i;
// The encoder component and decoder component can track or calculate the Bits_Deficit[i] parameter after encoding and decoding for each macroblock.//

(2) Algorithm
//set initial parameter values//
Q_MB[0]=StartQ;
Bits_Total[0]=0;
//procedure after coding of each MB//
for (i=0; i<N_MB; i++)
{
Bits_Total[i]=Bits_Total[i−1]+Bits_MB[i];
Bits_Deficit[i]=Bits_Total[i]−(i+1)*Bit_Budget/N_MB;
// (i+1)*Bit_Budget/N_MB is the total number of bits expected to have been spent to code MB[0] through MB[i]//
if (Bits_Deficit[i]>Bit_Deficit_Threshold)
Q_MB[i+1]+=1;
else if (Bits_Deficit[i]<−Bit_Surplus_Threshold)
Q_MB[i+1]−=1;
if (Q_MB[i+1]>MaxQ)
Q_MB[i+1]=MaxQ;
else if (Q_MB[i+1]<MinQ)
Q_MB[i+1]=MinQ;
}

The above example defined coding algorithm is but one example of a defined decoding algorithm that can be used by the systems and/or methods described in this disclosure, and this disclosure is not so limited. In accordance with various implementations of this disclosure, one or more other types of defined coding algorithms can be used to facilitate implicitly controlling quantization values in relation to coding macroblocks of video frames of a video frame sequence without having to carry explicit quantization change information in the coded video bitstream. These one or more other types of defined coding algorithms are considered to be part of this disclosure. For example, an alternate defined coding algorithm can use the quantization-related parameters described herein and/or other types of quantization-related parameters to facilitate implicitly controlling quantization values for coding macroblocks. The encoder management component 106 and decoder management component 108 can independently track at least a first subset of such quantization-related parameters during coding of macroblocks. The encoder management component 106 also can transmit a header comprising a second subset of such quantization-related parameters. The encoder management component 106 and decoder management component 108 can each implicitly control quantization values used in relation to coding of respective macroblocks of a current video frame based at least in part on the first subset of such quantization-related parameters and the second subset of such quantization-related parameters.

Also, with regard to the above example defined coding algorithm, the values used can be different than as provided in the above example defined coding algorithm. For example, instead of adjusting the quantization value by 1, when the accumulated bit deficit is greater than the accumulated bit deficit maximum threshold level, a coding algorithm can provide that the quantization be adjusted by a different value (e.g., 2, 3, or 4, etc.). Additionally or alternatively, there can be multiple threshold levels (e.g., bit deficit middle threshold level, bit deficit maximum threshold level, upper quantization threshold value, maximum quantization threshold value, etc.) used for accumulated bit deficits or accumulated bit surpluses, where respective quantization adjustments can be performed based at least in part on the respective types of threshold levels.

As described herein, the encoder management component 106 and decoder management component 108 can each independently derive (e.g., calculate) and implicitly control (e.g., adjust) quantization values to a macroblock level for video frames to facilitate maintaining constant bit rate control in relation to the video frame sequence, in accordance with an applicable defined coding algorithm(s). As a result, the encoder component 102 does not have to include explicit quantization change information (e.g., specified quantization value, specified quantization adjustment value, etc.) in the coded video bitstream communicated to the decoder component 104 in order to control quantization and the bit rate. Conventionally carrying explicit quantization change information in the bitstream can use a substantial amount of bits. Since the encoder component 102 does not have to include such explicit quantization change information in the bitstream, there can be a considerable reduction in the amount of bit rate used in relation to the coded video bitstream. As a result, there can be an increase in the available amount of bit rate that can be used for other desired communication purposes. At the same time, since the encoder management component 106 and decoder management component 108 can respectively operate to implicitly control quantization values to a macroblock level to facilitate maintaining a desired constant bit rate, as more fully disclosed herein, video quality can be maintained such that video quality can be at least at the quality level provided by conventional codec designs.

In some implementations, a video frame can be divided into multiple slices or segments. The encoder management component 106 and decoder management component 108 can use a relatively similar defined coding algorithm(s) as that described with regard to implicitly controlling quantization levels during coding of macroblocks on a video-frame level, except that the defined coding algorithm(s), parameter values, and/or communication of parameters can be modified to account for the video frame being divided into multiple slices or segments. For example, the encoder management component 106 can transmit a second-subset of quantization parameters in a slice header or segment header in relation to a coded video bitstream. The decoder management component 108 can derive (e.g., determine, calculate) quantization values to use to control quantization values in relation to coding macroblocks of a slice or segment, based at least in part on the second-subset of quantization parameters, in accordance with the modified coding algorithm. For the second-subset of quantization parameters, the encoder management component 106 can identify and use parameter values that can correspond to coding content on a slice or segment level, as opposed to coding content on a video-frame level. For instance, for the second-subset of quantization parameters, the encoder management component 106 can identify and use parameter values that can account for (e.g., compensate for) the video frame being divided into multiple slices or segments.

In certain implementations, a codec, including the encoder component 102 and/or a decoder component (e.g., similar to decoder component 104), can use a different partition of the video bitstream to carry, for example, overhead information relating to motion vector, mode, or other overhead information, while carrying residual coding in a separate partition of the video bitstream. In such implementations, the encoder component 102 and decoder component 104 can already know such overhead information, e.g., before coding the residual error. In such instances, it can be more desirable and/or accurate for the encoder component 102 and decoder component 104 to deduct the overhead bits (e.g., bits relating to overhead information) from the frame bit budget and apply the deducted frame bit budget to control residual error coding. It also can or may be desirable for the encoder component 102 and decoder component 104 to adjust threshold information (e.g., bit deficit maximum threshold level, bit surplus threshold level, etc.) associated with the defined coding algorithm(s) to reflect this definition change in relation to the overhead information.

While implementations and aspects of this disclosure are described herein with regard to macroblocks, this disclosure is not so limited. For example, the implementations and aspects disclosed herein in relation to macroblocks can be used (e.g., applied) in relation to various types of units or regions of a video frame, such as, for example, blocks, macroblocks, sub-macroblocks, motion granularity units, coding units, and/or other types of image compression units, and these various types of image compression units are within the scope of this disclosure.

Figure 2:
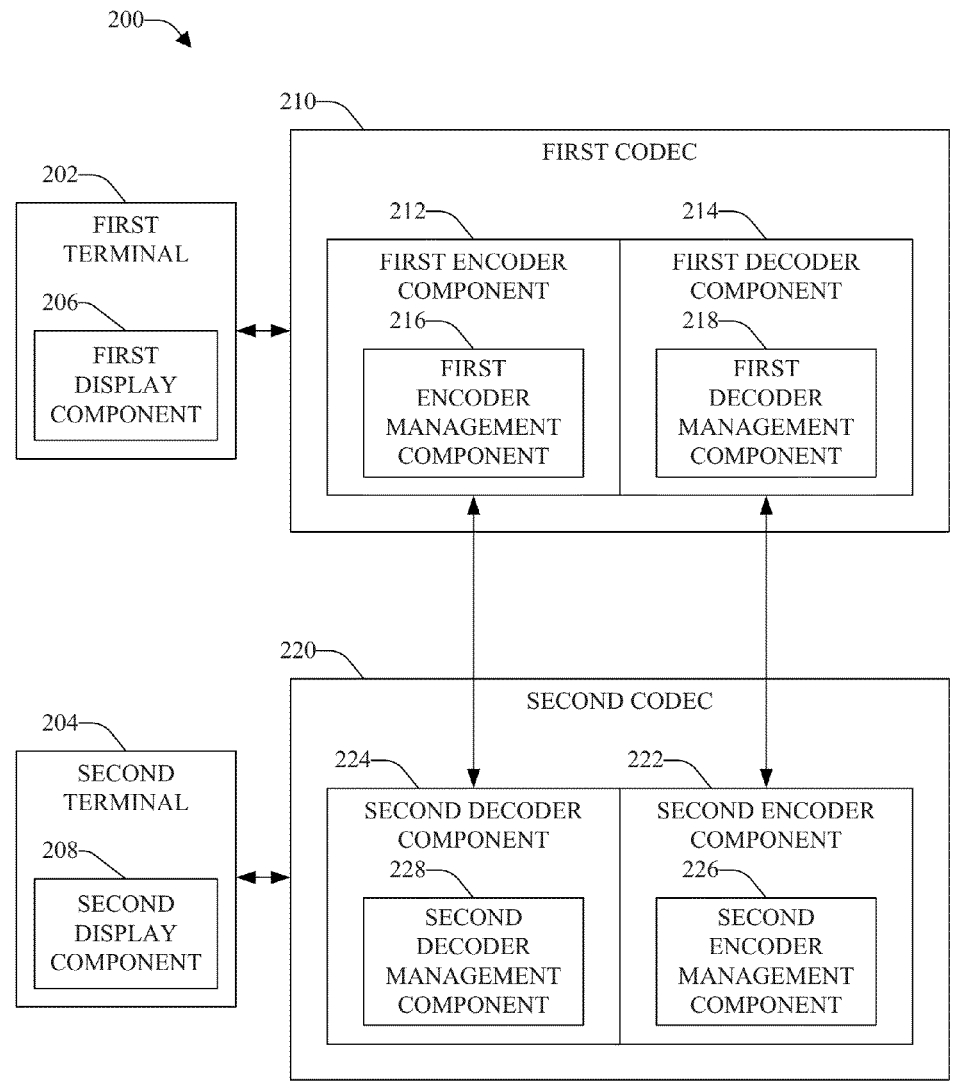
FIG. 2 depicts a block diagram of an example system that can employ codecs that can implicitly control quantization levels in relation to coding video content to maintain a desired constant bit rate, in accordance with various aspects and implementations.

FIG. 2 depicts a block diagram of example system 200 that can employ codecs that can implicitly control quantization levels in relation to coding video content to maintain a desired constant bit rate, in accordance with various aspects and implementations. The system 200 can include a first terminal 202 and a second terminal 204 that can be communicatively connected to each other at desired times (e.g., during a video session). The communication connection can be a wireline or a wireless connection. The first terminal 202 and the second terminal 204 can communicate information, including video content, to each other. The first terminal 202 can include a first display component 206 that can present (e.g., display) information to a user who is using the first terminal 202. The second terminal 204 can include a second display component 208 that can present (e.g., display) information, such as video content, to another user who is using the second terminal 204. In some implementations, the video content can be part of a video conferencing session involving the user, who can perceive (e.g., viewing) video content received from the second terminal 204 via the first display component 206 of the first terminal 202, and the other user, who can perceive video content received from the first terminal 202 via the second display component 208 of the second terminal 204.

In certain implementations, a terminal (e.g., 202, 204) can capture information (e.g., video or audio information), or can be associated with one or more components (e.g., video and/or audio capture devices, such as a camera, video recorder, web cam, etc.; not shown in FIG. 2) that can capture information (e.g., video and/or audio information) and provide the information to the associated terminal, for example, during a video session. The terminal receiving video and/or audio information can process (e.g., encode) such information for transmission to the other terminal via a communication channel. A terminal (e.g., 202, 204) can include, for example, a computer, a phone (e.g., a mobile phone and/or smart phone), a tablet, an electronic gaming device, an application-specific computing device (e.g., communication device specifically for video conferencing), an Internet Protocol Television (IPTV), or a combination of communication devices and/or peripheral devices.

The first terminal 202 can be associated with (e.g., include or be communicatively connected to) a first codec 210 that can include a first encoder component 212 and a first decoder component 214. The first encoder component 212 can contain a first encoder management component 216, and the first decoder component 214 can contain a first decoder management component 218.

The second terminal 204 can be associated with (e.g., include or be communicatively connected to) a second codec 220 that can include a second encoder component 222 and a second decoder component 224. The second encoder component 222 can contain a second encoder management component 226, and the second decoder component 224 can contain a second decoder management component 228.

The first encoder component 212 and second encoder component 222 can each be the same as or similar to, and/or can include the same or similar functionality as, encoder components, as more fully disclosed herein. The first encoder management component 216 and second encoder management component 226 can each be the same as or similar to, and/or can include the same or similar functionality as, encoder management components, as more fully disclosed herein. The first decoder component 214 and second decoder component 224 can each be the same as or similar to, and/or can include the same or similar functionality as, decoder components, as more fully disclosed herein. The first decoder management component 218 and second decoder management component 228 can each be the same as or similar to, and/or can include the same or similar functionality as, decoder management components, as more fully disclosed herein.

At desired times, the first terminal 202 and second terminal 204 can be used to communicate information, such as video content (e.g., during a video conferencing session), to each other. The first encoder component 212 can encode video content (e.g., video frame sequence) associated with the first terminal 202 (e.g., content captured by or in relation to the first terminal 202) and can transmit the encoded video content to the second decoder component 224. The second decoder component 224 can decode the encoded video content received from the first encoder component 212 and can reconstruct that video content for display on the second display component 208 of the second terminal 204. The second encoder component 222 can encode video content associated with the second terminal 204 (e.g., content captured by or in relation to the second terminal 204) and can transmit that encoded video content to the first decoder component 214. The first decoder component 214 can decode the encoded video content received from the second encoder component 222 and can reconstruct that video content for display on the first display component 206 of the first terminal 202.

The first encoder management component 216 and second decoder management component 228 can operate to implicitly control quantization levels (e.g., dynamically) to a macroblock level for the coded video bitstream communicated between the first encoder component 212 and second decoder component 224 to facilitate controlling the bit rate to maintain a desired constant bit rate. The second encoder management component 226 and first decoder management component 218 can operate to implicitly control quantization levels (e.g., dynamically) to a macroblock level for the coded video bitstream communicated between the second encoder component 222 and first decoder component 214 to facilitate controlling the bit rate to maintain a desired constant bit rate.

Figure 3:
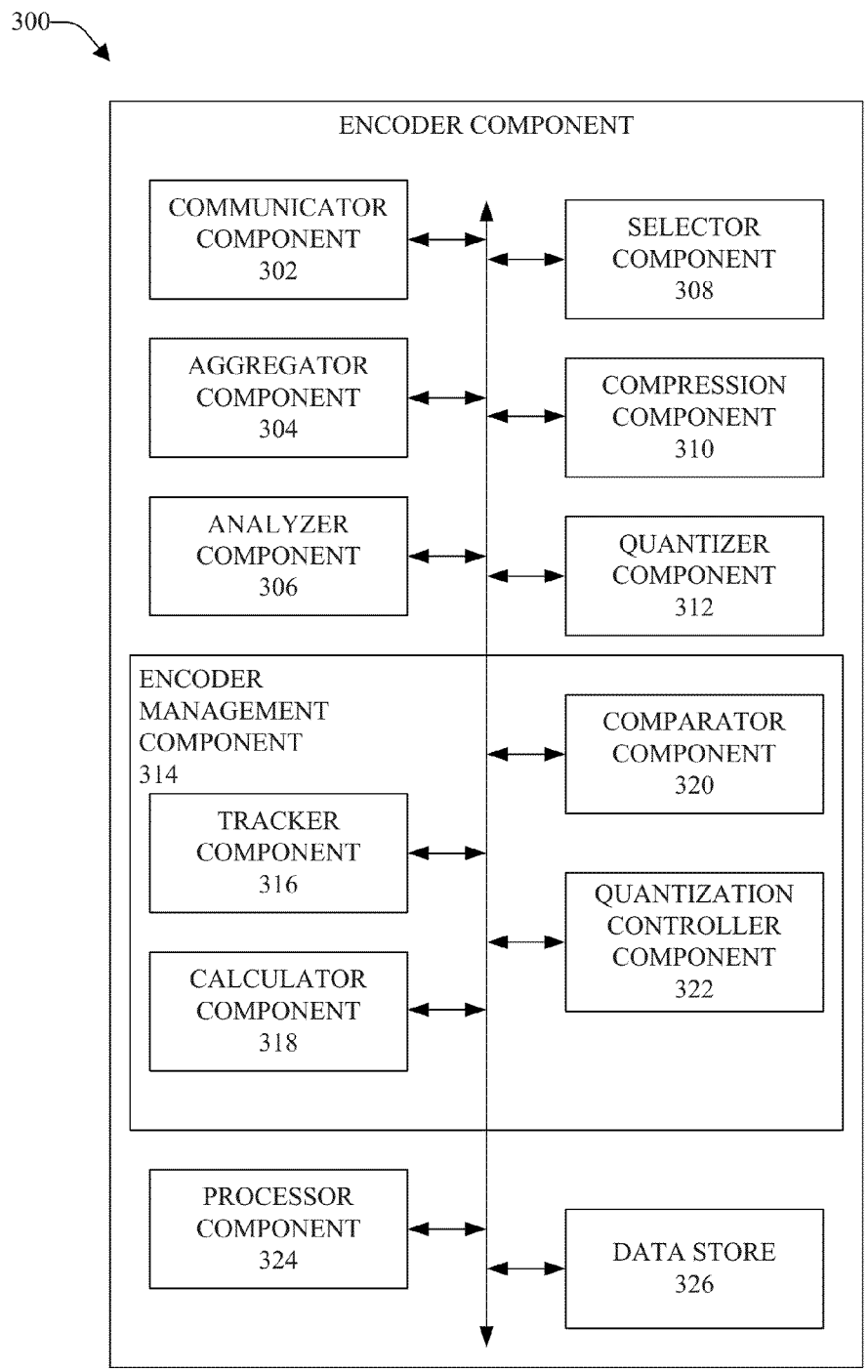
FIG. 3 illustrates a block diagram of an example encoder component in accordance with various aspects and implementations of this disclosure.

FIG. 3 illustrates a block diagram of an example encoder component 300 in accordance with various aspects and implementations of this disclosure. The encoder component 300 can be associated with a terminal that, at desired times, can be communicatively connected to another terminal and/or a decoder component associated therewith to facilitate communication of video content between the terminals. The other terminal can include the decoder component, which can decode encoded video content received from the encoder component 300 to facilitate display of the video content at the decoder end. In some implementations, the encoder component 300 can be part of a codec. The encoder component 300 can include a communicator component 302, an aggregator component 304, an analyzer component 306, a selector component 308, a compression component 310, and a quantizer component 312.

The communicator component 302 can communicate (e.g., transmit, receive) information between the encoder component 300 and other components (e.g., decoder component, user interface, media source, media capture device, data store, etc.). The information can include, for example, video frames associated with a video session, information that can facilitate encoding data associated with video frames, information relating to defined coding criterion or corresponding rules, information relating to encoding parameters, encoding-related algorithms (e.g., defined coding algorithm(s)), etc. The encoder component 300 can use the information to facilitate encoding data (e.g., video frames). The communicator component 302 also can transmit encoded video frames (e.g., encoded video bitstream) to, for example, a decoder component or data store associated with the video session. In some implementations, the communicator component 302 can establish a communication channel (e.g., wireline or wireless communication channel) to communicate information between the encoder component 300 and another component (e.g., decoder component of another terminal).

The aggregator component 304 can aggregate data received (e.g., obtained) from various entities (e.g., decoder component, media source, media capture device, processor, data store, compression component, user interface, etc.). The aggregator component 304 can correlate respective items of data based at least in part on type of data, source of the data, time or date the data was generated or received, encoding state of the data, a video frame or macroblock to which the data relates, etc., to facilitate analyzing of the data by the analyzer component 306.

The analyzer component 306 can analyze data to facilitate encoding data, identifying parameters (e.g., quantization-related parameters), controlling the quantization level associated with coding a macroblock of a video frame, determining a quantization value to apply when coding the macroblock, etc., and can generate analysis results, based at least in part on the data analysis. For example, the analyzer component 306 can analyze information relating to the first subset of quantization-related parameters and the second subset of quantization-related parameters to facilitate determining a quantization value to be used for coding a macroblock of the video frame, in accordance with defined coding criterion, as more fully described herein. The analyzer component 306 can provide analysis results relating to encoding and quantization levels to use for encoding to the encoder management component 314. The encoder management component 314 can determine a quantization value to be used for coding a macroblock of the video frame, based at least in part on such analysis results.

The analyzer component 306 or an associated component (e.g., encoder management component 314) also can facilitate tracking or calculating encoding-related parameters, such as quantization-related parameters (e.g., associated with the first subset of quantization-related parameters), for use in controlling encoding, including controlling quantization levels in relation to encoding, macroblocks of a video frame. The encoder component 300 can use analysis results relating to the encoding-related parameters to facilitate enabling the compression component 310 to efficiently encode macroblocks of video frames and the encoder management component 314 to control (e.g., implicitly) quantization values used for encoding macroblocks.

The selector component 308 can select items of data, an applicable encoding-related algorithm (e.g., compression algorithm, defined coding algorithm(s), etc.), encoding-related parameter values, or other information, to facilitate encoding data, controlling quantization values to be used in relation to encoding macroblocks, etc. For example, the selector component 308 can select one or more parameters, one or more items of data, etc., relevant to an encoding task (e.g., tracking a quantization-related parameter, determining a quantization-related parameter, determining whether to adjust a quantization value, etc.) being performed by the encoder component 300.

The compression component 310 can encode or compress data associated with a video frame in accordance with a defined encoding or compression algorithm. In some implementations, the compression component 310 can use a desired quantization value that can correspond to the compression level to be used during the encoding of a macroblock of a video frame. The quantizer component 312 can operate in conjunction with the compression component 310 to set and/or apply a desired quantization value or level in relation to encoding of the macroblock, e.g., as determined by the encoder management component 314.

The encoder component 300 can include the encoder management component 314, which can control (e.g., implicitly and/or dynamically) quantization values that can be used in relation to encoding macroblocks of video frames. The encoder management component 314 can include, for example, a tracker component 316, a calculator component 318, a comparator component 320, and a quantization controller component 322.

The tracker component 316 can monitor or track quantization-related parameters, including, for example, the actual bit spending in relation to encoding of a macroblock, the total or accumulated number of bits spent in relation to encoding of all of the macroblocks that have been coded for a video frame, the accumulated bit spending deficit in relation to encoding a video frame. For example, the tracker component 316 can track the actual number of bits spent in relation to encoding a current macroblock of a video frame. As another example, after encoding of the current macroblock, the tracker component 316 can identify and track the accumulated bit spending deficit to that point of encoding of the video frame.

The calculator component 318 can calculate or determine various parameters, including parameters relating to encoding content, in accordance with respective mathematical equations, functions, or algorithms. For example, the calculator component 318 can calculate the expected number of bits to be spent per macroblock as a function of the bit budget for the current video frame and the number of macroblocks within the current video frame. As another example, after coding of a current macroblock in a current video frame, the calculator component 318 can calculate the accumulated bit spending deficit in relation to coding of the macroblocks of the current video frame. The calculator component 318 can calculate this accumulated bit spending deficit as a function of the accumulated number of bits spent for coding all of the previously encoded macroblocks of the current video frame and the expected accumulated number of bits to be spent for encoding all of the previously coded macroblocks of the current video frame.

The comparator component 320 can compare respective items of information to make determinations (e.g., generate comparison results) in relation to the respective items of information. The comparator component 320 can compare the accumulated bit spending deficit associated with a current video frame to a bit deficit maximum threshold level to determine whether the accumulated bit spending deficit exceeds an applicable bit deficit maximum threshold level, and can generate comparison results (e.g., deficit exceeds threshold, deficit does not exceed threshold) based at least in part on such comparison. The comparator component 320 also can compare the accumulated bit spending deficit associated with a current video frame to an inverse value of a bit surplus maximum threshold to determine whether the accumulated bit spending deficit is less than the inverse value of the bit surplus maximum threshold, and can generate comparison results (e.g., deficit is less than threshold, deficit is not less than threshold) based at least in part on such comparison. The encoder management component 314 can use these comparison results to facilitate determining whether to adjust a quantization value to a preliminary adjusted quantization value in relation to encoding a next macroblock of the current video frame. The comparator component 320 also can compare a preliminary adjusted quantization value to an applicable maximum quantization value and/or applicable minimum quantization value to facilitate determining whether the preliminary adjusted quantization value is within a desired threshold range. Based at least in part on such comparison, the comparator component 320 can generate results that can indicate whether the preliminary adjusted quantization value is within a desired threshold range. For example, depending in part on the comparison, the comparator component 320 can generate results that can indicate the preliminary adjusted quantization value is greater than the maximum threshold quantization value or not greater than the maximum threshold quantization value, and/or lower than the minimum threshold quantization value or not lower than the minimum threshold quantization value.

The quantization controller component 322 can control (e.g., adjust or maintain) a quantization value for use in encoding a macroblock of the current video frame, in accordance with the defined coding algorithm(s) and defined coding criterion. The quantization controller component 322 can maintain the quantization value at a current quantization value for encoding of a next macroblock, for example, when the accumulated bit spending deficit associated with a current video frame after coding a current macroblock is within an applicable threshold range (e.g., not greater than bit deficit maximum threshold value, not lower than the inverse value of the bit surplus maximum threshold).

For coding a next macroblock of the current video frame, the quantization controller component 322 can adjust the current quantization value to a higher quantization value, but no higher than the applicable maximum quantization value, when the accumulated bit spending deficit is greater than the bit deficit maximum threshold value. For coding the next macroblock, the quantization controller component 322 can adjust the current quantization value to a lower quantization value, but no lower than the applicable minimum quantization value, when the accumulated bit spending deficit is less than the inverse value of the bit surplus maximum threshold (e.g., −Bit_Surplus_Threshold).

In some implementations, the encoder component 300 also can include a processor component 324 that can operate in conjunction with the other components (e.g., communicator component 302, aggregator component 304, analyzer component 306, etc.) to facilitate performing the various functions of the encoder component 300. The processor component 324 can employ one or more processors, microprocessors, or controllers that can process data, such as information relating to encoding data, information relating to other operations of the encoder component 300, and/or other information, etc., to facilitate encoding video content and/or performing other operations associated with the encoder component 300, as more fully disclosed herein. The processor component 324 can control data flow between the encoder component 300 and other components (e.g., media source, media capture device, decoder component, data store, computer-readable storage media, etc.) associated with the encoder component 300.

The encoder component 300 also can include a data store 326 that can store data structures (e.g., user data, video content, metadata), instructions, procedures, and/or code structure(s) (e.g., modules, objects, hashes, classes) to facilitate performing or controlling operations associated with the encoder component 300. The data store 326 also can store information (e.g., encoding-related algorithms, defined coding algorithm(s), encoding-related parameters, defined coding criterion, etc.) relating to encoding data, and/or information relating to other operations of the encoder component 300, etc., to facilitate encoding video content, and performing or controlling operations, associated with the encoder component 300. The processor component 324 can be coupled (e.g., through a memory bus) to the data store 326 in order to store and retrieve information desired to operate and/or confer functionality, at least in part, to the components (e.g., communicator component 302, aggregator component 304, analyzer component 306, etc.) of the encoder component 300, and/or substantially any other operational aspects of the encoder component 300.

Figure 4:
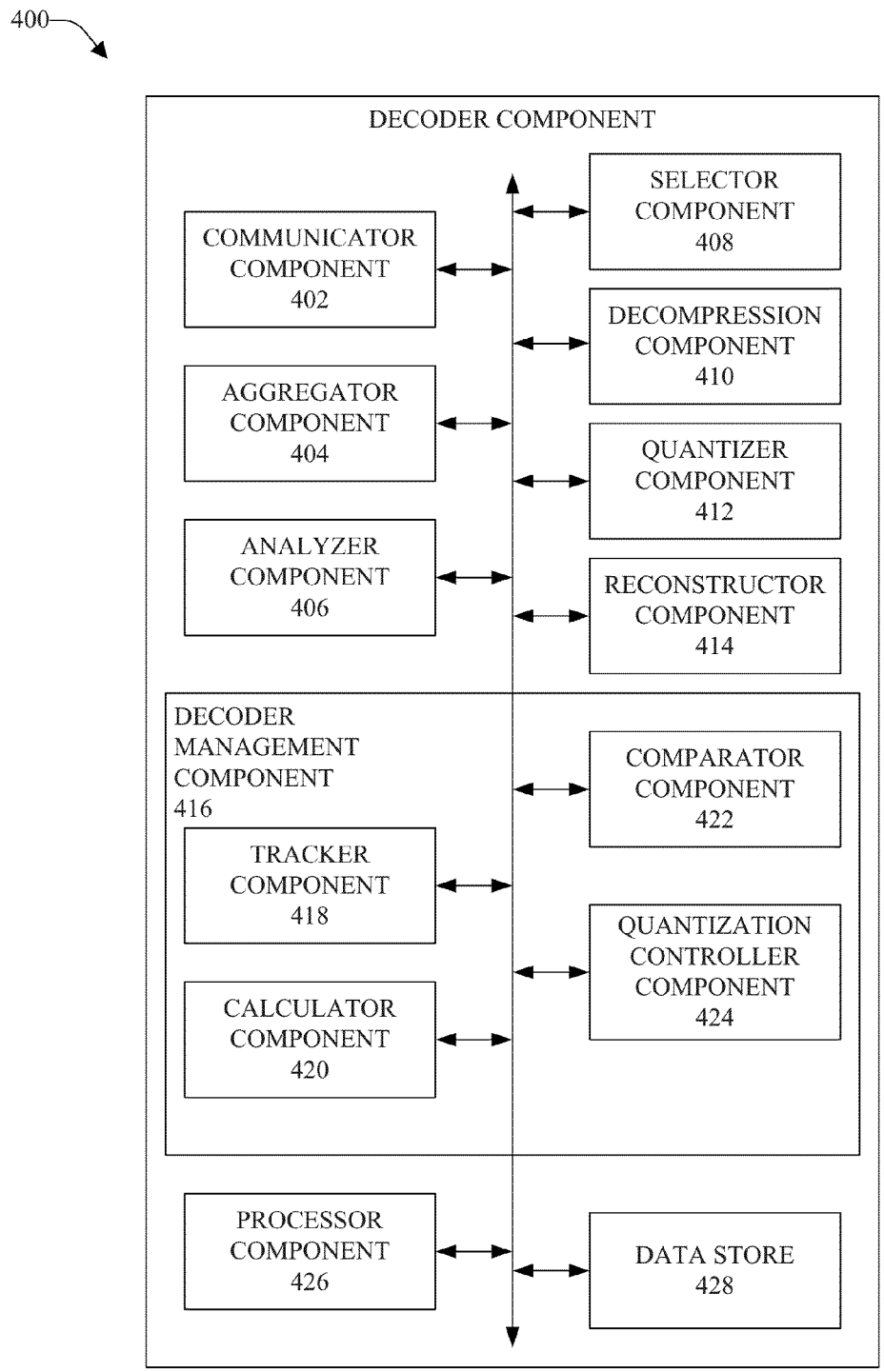
FIG. 4 presents a block diagram of an example decoder component in accordance with various aspects and implementations of this disclosure.

FIG. 4 depicts a block diagram of an example decoder component 400 in accordance with various aspects and implementations of this disclosure. The decoder component 400 can be associated with a terminal that, at desired times, can be communicatively connected to another terminal and/or an encoder component associated therewith to facilitate communication of video content between the terminals. The other terminal can include an encoder component that can encode video content at that end and can transmit the encoded video content to the decoder component 400. The decoder component 400 can decode the encoded video content and reconstruct the video content to facilitate display of the video content at the decoder end. In some implementations, the decoder component 400 can be part of a codec. The decoder component 400 can include a communicator component 402, an aggregator component 404, an analyzer component 406, a selector component 408, a decompression component 410, a quantizer component 412, and a reconstructor component 414.

The communicator component 402 can communicate (e.g., transmit, receive) information between the decoder component 400 and other components (e.g., encoder component, user interface, display component, data store, etc.). The information can include, for example, video frames associated with a video session, information that can facilitate decoding and reconstructing data associated with video frames, information relating to defined coding criterion or corresponding rules, information relating to decoding parameters, decoding-related algorithms (e.g., defined coding algorithm(s)), etc. The decoder component 400 can use the information to facilitate decoding and reconstructing data (e.g., video frames). The communicator component 402 can receive encoded video frames (e.g., encoded video bitstream) from the encoder component or a data store associated with the video session. In some implementations, the communicator component 402 can establish a communication channel (e.g., wireline or wireless communication channel) to communicate information between the decoder component 400 and another component (e.g., encoder component of another terminal, display component of terminal at the decoder end, etc.).

The aggregator component 404 can aggregate data received (e.g., obtained) from various entities (e.g., encoder component, processor, data store, decompression component, user interface, etc.). The aggregator component 404 can correlate respective items of data based at least in part on type of data, source of the data, time or date the data was generated or received, decoding state of the data, a video frame or macroblock to which the data relates, etc., to facilitate analyzing of the data by the analyzer component 406.

The analyzer component 406 can analyze data to facilitate decoding data, identifying parameters (e.g., quantization-related parameters), controlling the quantization level associated with decoding a macroblock of a video frame, determining a quantization value to apply when decoding the macroblock, etc., and can generate analysis results, based at least in part on the data analysis. For example, the analyzer component 406 can analyze information relating to the first subset of quantization-related parameters and the second subset of quantization-related parameters to facilitate determining a quantization value to be used in relation to decoding a macroblock of the video frame, in accordance with defined coding criterion, as more fully described herein. The analyzer component 406 can provide analysis results relating to decoding and quantization levels to use for decoding a current macroblock to the decoder management component 416. The decoder management component 416 can determine a quantization value to be used in relation to decoding a current macroblock of the video frame, based at least in part on such analysis results.

The analyzer component 406 or an associated component (e.g., decoder management component 416) also can facilitate tracking or calculating decoding-related parameters, such as quantization-related parameters (e.g., associated with the first subset of quantization-related parameters), for use in controlling decoding, including controlling quantization levels in relation to decoding, macroblocks of a video frame. The decoder component 400 can use analysis results relating to the decoding-related parameters to facilitate enabling the decoder management component 416 to control (e.g., implicitly) quantization values used during decoding macroblocks and enabling the decompression component 410 to efficiently decode macroblocks of video frames.

The selector component 408 can select items of data, an applicable decoding-related algorithm (e.g., decompression algorithm, defined coding algorithm(s), etc.), decoding-related parameter values, or other information, to facilitate decoding data, controlling quantization values to be used in relation to decoding macroblocks, etc. For example, the selector component 408 can select one or more parameters, one or more items of data, etc., relevant to a decoding task (e.g., tracking a quantization-related parameter, determining a quantization-related parameter, determining whether to adjust a quantization value, etc.) being performed by the decoder component 400.

The decoder component 400 can include a decompression component 410 that can decode or decompress data associated with an encoded video frame in accordance with a defined decoding or decompression algorithm. In some implementations, the decompression component 410 can use a desired quantization value that can correspond to the decompression level to be used during the decoding of an encoded macroblock of a video frame. The quantizer component 412 can operate in conjunction with the decompression component 410 to set and/or apply a desired quantization value or level in relation to decoding of the encoded macroblock e.g., as determined by the decoder management component 416.

The reconstructor component 414 can reconstruct the video content from the decoded data associated with the video frame sequence to facilitate desired display of the video content on a terminal associated with the decoder component 400. The reconstructor component 414 can use a desired decoding-related algorithm (e.g., content reconstruction algorithm) to facilitate reconstructing the video content.

The decoder component 400 can include the decoder management component 416, which can control (e.g., implicitly and/or dynamically) quantization values that can be used in relation to decoding macroblocks of encoded video frames. The decoder management component 416 can include, for example, a tracker component 418, a calculator component 420, a comparator component 422, and a quantization controller component 424.

The tracker component 418 can monitor or track quantization-related parameters, including, for example, the actual bit spending in relation to coding of a current macroblock, the total or accumulated number of bits spent in relation to coding of all of the macroblocks that have been decoded for a current video frame, and/or the accumulated bit spending deficit in relation to coding a video frame. For example, the tracker component 418 can track the actual number of bits spent in relation to coding of a current macroblock of a current video frame that has been decoded. As another example, after decoding of the current macroblock, the tracker component 418 can identify and track the accumulated bit spending deficit to that point in relation to coding of macroblocks of the current video frame that have been decoded.

The calculator component 420 can calculate or determine various parameters, including parameters relating to coding of content, in accordance with respective mathematical equations, functions, or algorithms. For example, the calculator component 420 can calculate the expected or average number of bits to be spent in relation to coding per macroblock as a function of the bit budget for the current video frame and the number of macroblocks within the current video frame. As another example, after decoding of a current macroblock in a current video frame, the calculator component 420 can calculate the accumulated bit spending deficit in relation to coding of macroblocks of the current video frame up to the current point of decoding the macroblocks of the current video frame. The calculator component 420 can calculate this accumulated bit spending deficit as a function of the accumulated number of bits spent in relation to coding all of the previously decoded macroblocks of the current video frame and the expected accumulated number of bits to be spent for coding all of those previously decoded macroblocks.

The comparator component 422 can compare respective items of information to make determinations (e.g., generate comparison results) in relation to the respective items of information. The comparator component 422 can compare the accumulated bit spending deficit associated with a current video frame to a bit deficit maximum threshold level to determine whether the accumulated bit spending deficit exceeds the bit deficit maximum threshold level, and can generate comparison results (e.g., deficit exceeds threshold, deficit does not exceed threshold) based at least in part on such comparison. The comparator component 422 also can compare the accumulated bit spending deficit associated with a current video frame to an inverse value of a bit surplus maximum threshold to determine whether the accumulated bit spending deficit is less than the inverse value of the bit surplus maximum threshold, and can generate comparison results (e.g., deficit is less than threshold, deficit is not less than threshold) based at least in part on such comparison. The decoder management component 416 can use these comparison results to facilitate determining whether to adjust a quantization value to generate a preliminary next quantization value in relation to encoding a next macroblock of the current video frame. The comparator component 422 also can compare a preliminary adjusted quantization value to an applicable maximum quantization value and/or an applicable minimum quantization value to facilitate determining whether the preliminary adjusted quantization value is within a desired threshold range. Based at least in part on such comparison, the comparator component 422 can generate results that can indicate whether the preliminary adjusted quantization value is within a desired threshold range. For example, depending in part on the comparison, the comparator component 422 can generate results that can indicate the preliminary adjusted quantization value is greater than the maximum threshold quantization value or not greater than the maximum threshold quantization value, and/or lower than the minimum threshold quantization value or not lower than the minimum threshold quantization value.

The quantization controller component 424 can control (e.g., adjust or maintain) a quantization value for use in relating to decoding a next macroblock of the current video frame, in accordance with the defined coding algorithm(s), which can be based at least in part on defined coding criterion. The quantization controller component 424 can maintain the quantization value at a current quantization value for decoding of a next macroblock, for example, when the accumulated bit spending deficit associated with a current video frame after decoding a current macroblock is within an applicable threshold range (e.g., not greater than bit deficit maximum threshold value, not lower than the inverse value of the bit surplus maximum threshold).

For decoding a next macroblock of the current video frame, the quantization controller component 424 can adjust the current quantization value to a higher quantization value, but no higher than the applicable maximum quantization value, when the accumulated bit spending deficit is greater than the bit deficit maximum threshold value. For decoding the next macroblock, the quantization controller component 424 can adjust the current quantization value to a lower quantization value, but no lower than the applicable minimum quantization value, when the accumulated bit spending deficit is less than the inverse value of the bit surplus maximum threshold (e.g., −Bit_Surplus_).

In some implementations, the decoder component 400 also can include a processor component 426 that can operate in conjunction with the other components (e.g., communicator component 402, aggregator component 404, analyzer component 406, etc.) to facilitate performing the various functions of the decoder component 400, as more fully disclosed herein. The processor component 426 can employ one or more processors, microprocessors, or controllers that can process data, such as information relating to decoding data, information relating to other operations of the decoder component 400, and/or other information, etc., to facilitate decoding encoded video content and/or performing other operations associated with the decoder component 400, as more fully disclosed herein. The processor component 426 also can control data flow between the decoder component 400 and other components (e.g., encoder component, data store, computer-readable storage media, display component, etc.) associated with the decoder component 400.

The decoder component 400 also can include a data store 428 that can store data structures (e.g., user data, metadata), instructions, procedures, and/or code structure(s) (e.g., modules, objects, hashes, classes) to facilitate performing or controlling operations associated with the decoder component 400. The data store 428 also can store information (e.g., decoding-related algorithms (e.g., decompression algorithm(s), defined coding algorithm(s), etc.), decoding-related parameters, defined coding criterion, etc.) relating to decoding data and other information relating to other operations of the decoder component 400, to facilitate decoding video content, and performing or controlling operations, associated with the decoder component 400. The processor component 426 can be coupled (e.g., through a memory bus) to the data store 428 in order to store and retrieve information desired to operate and/or confer functionality, at least in part, to the components (e.g., communicator component 402, aggregator component 404, analyzer component 406, etc.) of the decoder component 400, and/or substantially any other operational aspects of the decoder component 400.

The encoder component 300 and decoder component 400 have been described herein to have respective communicator components (e.g., 302, 402), aggregator components (e.g., 304, 404), analyzer components (e.g., 306, 406), etc. In some implementations, an encoder component (e.g., 300) and a decoder component (e.g., 400) can be part of a same codec or system, and can share a same component(s) (e.g., communicator component, aggregator component, analyzer component, processor component, data store, etc.).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 5:
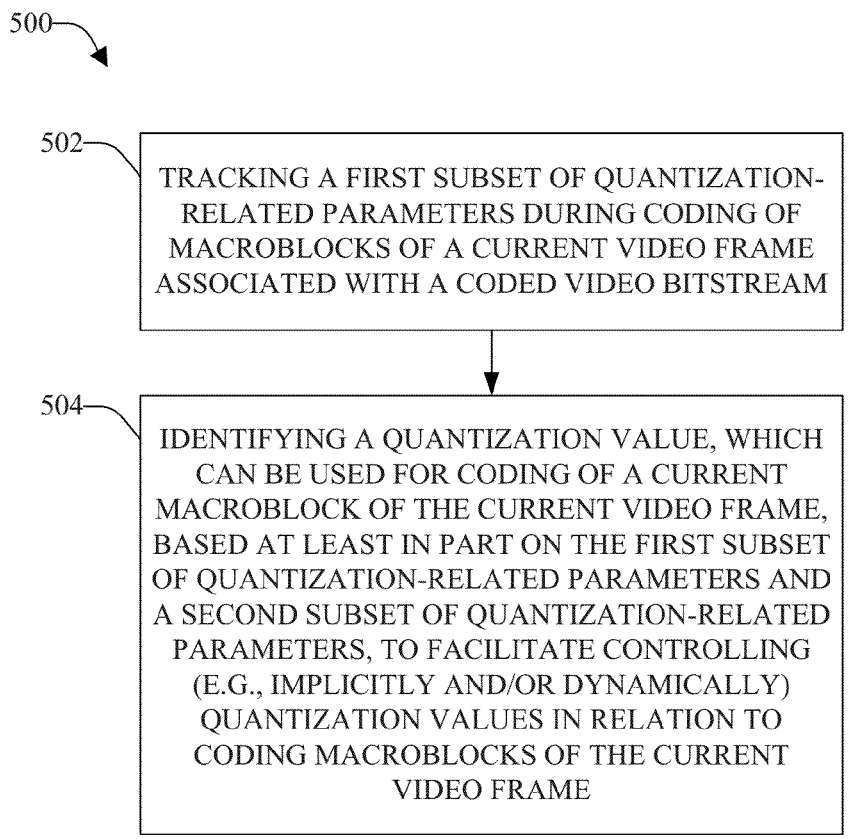
FIG. 5 illustrates a flow chart of an example method for implicitly controlling (e.g., dynamically) quantization values in relation to coding of macroblocks of a video frame (e.g., in real time), in accordance with various aspects and implementations.
Figure 6:
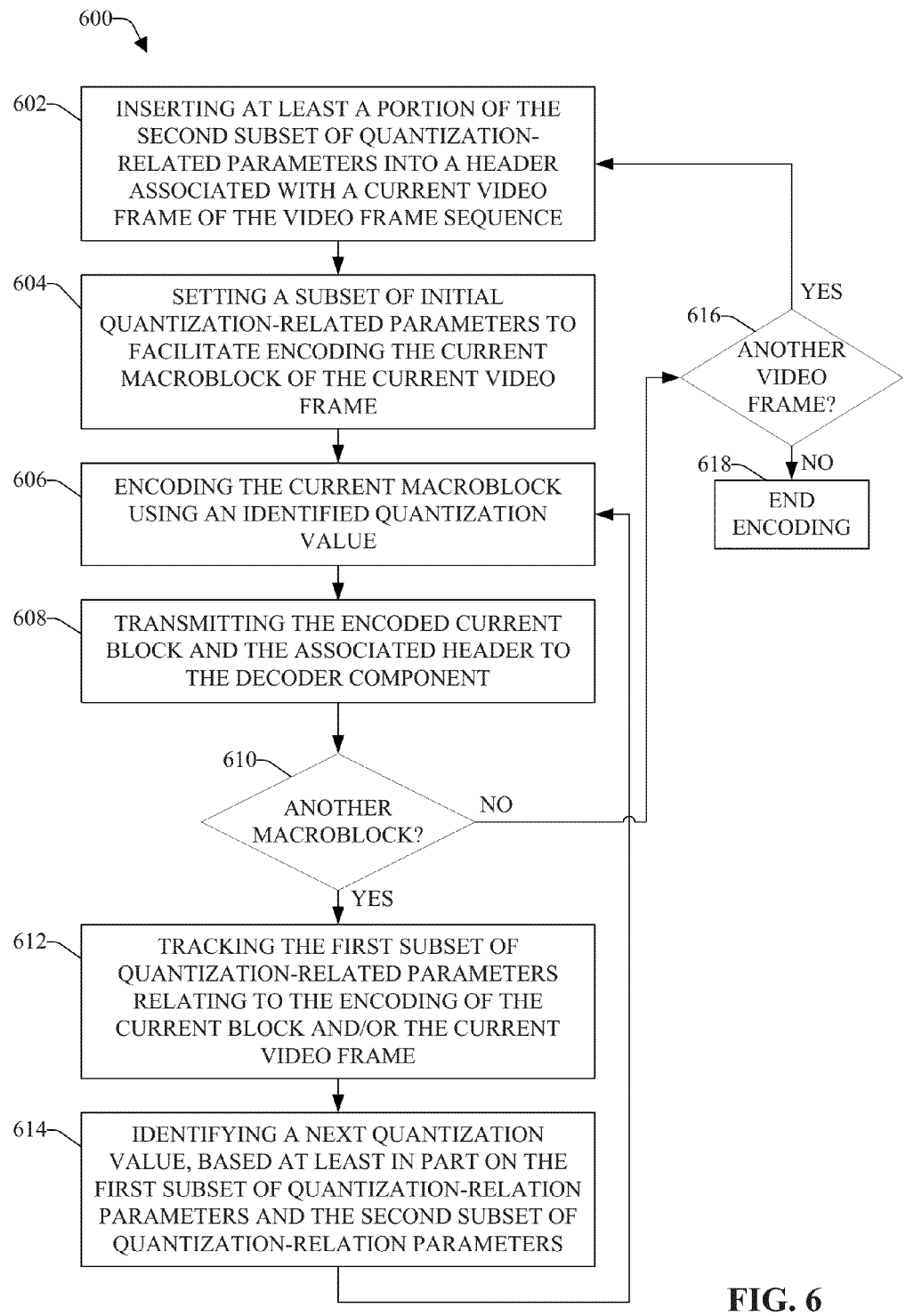
FIG. 6 depicts a flow chart of an example method for implicitly controlling (e.g., dynamically) quantization values in relation to encoding of macroblocks of a video frame (e.g., in real time), in accordance with various aspects and implementations.
Figure 7:
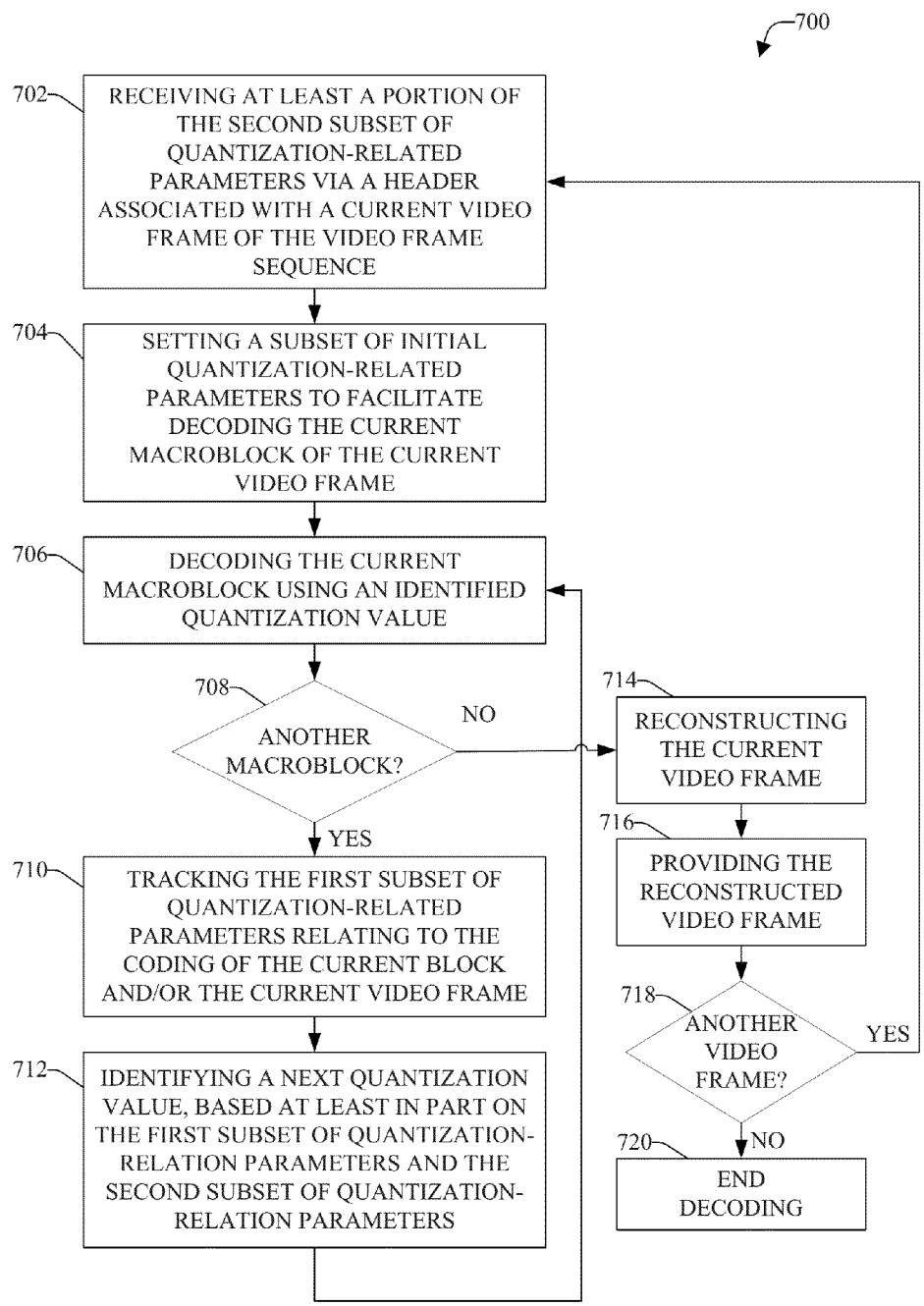
FIG. 7 depicts a flow chart of an example method for implicitly controlling (e.g., dynamically) quantization values in relation to decoding of macroblocks of a video frame (e.g., in real time), in accordance with various aspects and implementations.

In view of the example systems, components, and devices described above, example methods that can be implemented in accordance with this disclosure can be further appreciated with reference to flowcharts in FIGS. 5-7. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

With reference first to FIG. 5, illustrated is a flow chart of an example method 500 for controlling (e.g., implicitly and/or dynamically) quantization values in relation to coding of macroblocks of a video frame (e.g., in real time), in accordance with various aspects and implementations. The method 500 can be used, for example, by an encoder component when encoding a current macroblock of a current video frame and/or a decoder component when decoding a current macroblock of a current video frame.

At 502, a first subset of quantization-related parameters can be tracked during coding of macroblocks of a current video frame associated with a coded video bitstream. A coder management component (e.g., encoder management component on the encoder side, decoder management component on the decoder side) can track the first subset of quantization-related parameters.

During coding of the current video frame, each of the coder management components can independently monitor and track the first subset of quantization-related parameters in relation to coding of macroblocks of the current video frame associated with the coded video bitstream being communicated between an encoder component and a decoder component. The first subset of quantization-related parameters can include, for example, the actual number of bits spent in relation to coding of a current macroblock of a current video frame in the sequence, the accumulated number of bits spent for coded macroblocks of the current video frame, and/or the accumulated bit spending deficit associated with the current video frame after the coding of the current macroblock, etc.

At 504, a quantization value, which can be used in relation to coding of the current macroblock of the current video frame, can be identified, based at least in part on the first subset of quantization-related parameters and a second subset of quantization-related parameters, to facilitate controlling (e.g., implicitly and/or dynamically) quantization values in relation to coding the current video frame. Each of the coder management components (e.g., encoder management component on the encoding side, decoder management component on the decoding side) can control quantization values in relation to coding macroblocks (e.g., current macroblock) of the current video frame in order to maintain desired constant bit rate control in relation to the coded video bitstream. Each of the coder management components can independently identify, calculate and/or determine a quantization value that can be used to facilitate coding the current macroblock as a function of the first subset of quantization-related parameters and the second subset of quantization-related parameters.

For a video frame (e.g., current video frame) in the sequence, the encoder management component can insert the second subset of quantization-related parameters associated with that video frame into a header (e.g., frame or picture header). The encoder component can transmit the header with the second subset of quantization-related parameters to the decoder component. During decoding, the decoder management component can use the first subset (e.g., tracked subset) and second subset of quantization-related parameters to control (e.g., implicitly and/or dynamically) quantization values to a macroblock level of granularity to facilitate decoding encoded macroblocks of the current video frame. At the encoder-component side, the encoder management component also can use the first subset and second subset of quantization-related parameters to control (e.g., implicitly and/or dynamically) quantization values to a macroblock level of granularity to facilitate encoding macroblocks of the current video frame.

The second subset of quantization-related parameters can include a bit budget for the current video frame, the starting quantization value of the current video frame, the quantization value (e.g., starting quantization value) for the first macroblock of the current video frame to be encoded, and/or the total number of macroblocks of the current video frame. In accordance with various implementations, the total number of macroblocks of the current video frame can be carried in the coded video bitstream or can be derived (e.g., calculated) based at least on other parameters carried in the bitstream. The second subset of quantization-related parameters also can include the bit spending threshold deficit level to use in determining whether to increase a quantization value in relation to coding a macroblock and/or a bit spending threshold surplus level to use in determining whether to decrease a quantization value in relation to coding of a macroblock. The second subset of quantization-related parameters also can include a maximum threshold quantization value allowed for the current video frame and/or a minimum threshold quantization value allowed for the current video frame. The second subset of quantization-related parameters further can include other types of parameter information, but does not have to include explicit quantization change information (e.g., quantization value (e.g., except for the starting quantization value for the first macroblock), quantization adjustment value).

Referring next to FIG. 6, depicted is a flow chart of an example method 600 for controlling (e.g., implicitly and/or dynamically) quantization values in relation to encoding of macroblocks of a video frame (e.g., in real time), in accordance with various aspects and implementations. The method 600 can be used, for example, by an encoder component, which can include an encoder management component that can implicitly and/or dynamically control quantization values (e.g., in real time) to a macroblock level of granularity during encoding of macroblocks of a video frame. The method 600 can be employed by the encoder management component to implicitly and/or dynamically control quantization values for use during coding of macroblocks of a current video frame in a video frame sequence. The encoder management component can control quantization values for respective macroblocks of the current video frame based at least in part on a first subset of quantization-related parameters and a second subset of quantization-related parameters associated with the current video frame.

At 602, at least a portion of the second subset of quantization-related parameters can be inserted into a header (e.g., picture or frame header) associated with a current video frame of the video frame sequence. The encoder management component can insert at least a portion of the second subset of quantization-related parameters into the header associated with the current video frame.

At 604, a subset of initial quantization-related parameters can be set to facilitate encoding the current macroblock of the current video frame. The encoder management component can identify and set the respective quantization-related parameters of the subset of initial quantization-related parameters, based at least in part on the second subset of quantization-related parameters and the defined coding criterion. The subset of initial quantization-related parameters (e.g., starting quantization value for the current macroblock, expected or average number of bits to be spent for coding a macroblock of the current video frame, etc.) can include or can be based at least a part on the second subset of quantization-related parameters associated with the current video frame.

At 606, the current macroblock can be encoded using the identified quantization value, in accordance with the defined coding algorithm(s). The encoder component can encode the current macroblock using the identified quantization value. The encoder management component can identify the quantization value as the starting quantization value for the first macroblock of the current video frame. For other macroblocks of the current video frame, the encoder management component can identify or calculate the quantization value to be used in relation to encoding a then current macroblock, based at least in part on the first subset of quantization-related parameters and the second subset of quantization-related parameters associated with the current video frame, in accordance with the applicable defined coding algorithm(s).

At 608, the encoded current block and the associated header can be transmitted to the decoder component. The encoder component can transmit the encoded current block and the associated header, including the at least a portion of the second subset of quantization-related parameters, as part of a coded video bitstream to the decoder component, which can be associated with a terminal for use in displaying the video content (e.g., reconstructed video content).

At 610, a determination can be made regarding whether there is another macroblock in the current video frame that remains to be encoded. The encoder management component can determine whether there is another macroblock in the current video frame that remains to be encoded.

If it is determined that there is another macroblock in the current video frame that remains to be encoded, at 612, the first subset of quantization-related parameters relating to the encoding of the current block and/or the current video frame can be tracked. If there is another macroblock in the current video frame that remains to be encoded, the encoder management component can analyze information (e.g., information relating to the first subset of quantization-relation parameters) in relation to coding the most recent macroblock and/or other information to facilitate controlling the quantization value in relation to coding the next macroblock of the current video frame. The encoder management component can monitor and track the first subset of quantization-related parameters. The encoder management component can identify or calculate a quantization-related parameter(s) (e.g., actual number of bits spent in coding the current macroblock, the accumulated number of bits used to code the coded macroblocks of the current video frame, the accumulated bit spending deficit for the current video frame after the coding of the current macroblock), which can be part of the first subset of quantization-related parameters.

At 614, a next quantization value can be identified, based at least in part on the first subset of quantization-relation parameters and the second subset of quantization-relation parameters, for use during encoding the next macroblock (e.g., the new current macroblock) of the current video frame. The encoder management component can determine whether the current quantization value, which was used in relation to encoding the current macroblock just encoded, is to remain at the same value or whether the quantization value is to be increased or decreased by a defined amount, in relation to encoding the next macroblock.

The encoder management component can determine whether the accumulated bit spending deficit for the current video frame is within the bit deficit threshold range (e.g., less than the bit deficit maximum threshold value, less than the inverse value of the bit surplus maximum threshold). If the accumulated bit spending deficit for the current video frame is within the bit deficit threshold range, the encoder management component can maintain the quantization value at the current value in relation to encoding the next macroblock.

If the accumulated bit spending deficit for the current video frame is not within the bit deficit threshold range, the encoder management component can adjust the current quantization value, which was used to encode the most recently coded block, to another quantization value to generate a preliminary next quantization value. For example, if the accumulated bit spending deficit for the current video frame is greater than or equal to the bit deficit maximum threshold value, the encoder management component can increase the current quantization value by a defined amount to generate a preliminary next quantization value. If the accumulated bit spending deficit for the current video frame is greater than or equal to the inverse of the bit surplus maximum threshold value, the encoder management component can decrease the current quantization value by a defined amount to generate a preliminary next quantization value.

The encoder management component also can determine whether a preliminary next quantization value is within a quantization value threshold range (e.g., lower than the maximum threshold quantization value, higher than the minimum threshold quantization value). If the encoder management component determines that a preliminary next quantization value is within the quantization value threshold range, the encoder management component can identify that preliminary next quantization value as the next quantization value to be used to encode the next macroblock.

If the encoder management component determines that a preliminary next quantization value is not within the quantization value threshold range, the encoder management component can adjust the quantization value to set it at the desired (e.g., appropriate) threshold quantization value. For example, if the encoder management component determines that a preliminary next quantization value is greater than the maximum threshold quantization value, the encoder management component can adjust the preliminary next quantization value to set it at the maximum threshold quantization value, which can be used to facilitate encoding the next macroblock. If the encoder management component determines that a preliminary next quantization value is less than the minimum threshold quantization value, the encoder management component can adjust the preliminary next quantization value to set it at the minimum threshold quantization value, which can be used to facilitate encoding the next macroblock.

At this point, the method 600 can return to reference numeral 606, wherein the next macroblock (that is, the new current macroblock) can be encoded using the identified quantization value (e.g., the next quantization value identified for use in encoding the next macroblock), and the method 600 can proceed from that point.

Referring again to reference numeral 610, if, at 610, it is determined that there are no other macroblocks in the current video frame that remain to be encoded, at 616, a determination can be made regarding whether there is another video frame of the video frame sequence that remains to be encoded. If, at 616, it is determined that there exists another video frame of the video frame sequence that remains to be encoded, the method 600 can return to reference numeral 602, wherein at least a portion of a second subset of quantization-related parameters can be inserted into a header (e.g., picture or frame header) associated with that video frame (e.g., the new current video frame). The respective values of the second subset of quantization-related parameters associated with this video frame can be the same as or different from values of the second subset of quantization-related parameters associated with the most recently encoded video frame. The method 600 can proceed from that point. If, at 616, it is determined that there are no other video frames of the video frame sequence that remain to be encoded, at 618, the encoding of the coded video bitstream can end.

Referring next to FIG. 7, depicted is a flow chart of an example method 700 for controlling (e.g., implicitly and/or dynamically) quantization values in relation to decoding of macroblocks of a video frame (e.g., in real time), in accordance with various aspects and implementations. The method 700 can be used, for example, by a decoder component, which can include a decoder management component that can implicitly and/or dynamically control quantization values (e.g., in real time) to a macroblock level of granularity during decoding of macroblocks of a video frame. The method 700 can be employed by the decoder management component to implicitly and/or dynamically control quantization values for use during coding of macroblocks of a current video frame in a video frame sequence. The decoder management component can control quantization values for respective macroblocks of the current video frame based at least in part on a first subset of quantization-related parameters and a second subset of quantization-related parameters associated with the current video frame.

At 702, at least a portion of the second subset of quantization-related parameters can be received via a header (e.g., picture or frame header) associated with a current video frame of the video frame sequence. The decoder management component can receive at least a portion of the second subset of quantization-related parameters, which can be contained in a header associated with the current video frame, from an encoder component (or other component associated therewith).

At 704, a subset of initial quantization-related parameters can be set to facilitate decoding the current macroblock of the current video frame. The decoder management component can identify and set the respective quantization-related parameters of the subset of initial quantization-related parameters, based at least in part on the second subset of quantization-related parameters and the defined coding criterion. The subset of initial quantization-related parameters (e.g., starting quantization value for the current macroblock, expected number of bits to be spent per macroblock for coding in the current video frame, etc.) can include or can be based at least a part on the information (e.g., the portion of the second subset of quantization-related parameters) contained in the header associated with the current video frame. In accordance with various implementations, the decoder management component also can identify or derive the total number of macroblocks of the current video frame from information (e.g., a total-macroblocks-of-frame parameter or other parameters) contained in the coded video bitstream. The decoder management component can use the total number of macroblocks for the current video frame to facilitate identifying an initial quantization-related parameter and/or identifying a quantization-related parameter of the first subset of the quantization-related parameters.

At 706, the current macroblock can be decoded using the identified quantization value, in accordance with the defined coding algorithm(s). The decoder component can decode the current macroblock using the identified quantization value. The decoder management component can identify the quantization value as the starting quantization value for the first macroblock of the current video frame. For other macroblocks of the current video frame, the decoder management component can identify or calculate the quantization value that can be used in relation to a current macroblock to be decoded, based at least in part on the first subset of quantization-related parameters and the second subset of quantization-related parameters associated with the current video frame, in accordance with the applicable defined coding algorithm(s). The respective parameter values used with regard to the defined coding algorithm(s) can be based at least in part on the defined coding criterion.

At 708, a determination can be made regarding whether there is another macroblock in the current video frame that remains to be decoded. The decoder management component can determine whether there is another macroblock in the current video frame that remains to be decoded.

If it is determined that there is another macroblock in the current video frame that remains to be decoded, at 710, the first subset of quantization-related parameters relating to the coding of the current block and/or the current video frame can be tracked. If there is another macroblock in the current video frame that remains to be decoded, the decoder management component can analyze information (e.g., information relating to the first subset of quantization-relation parameters) in relation to coding of the most recent macroblock that was decoded and/or other information to facilitate controlling the quantization value in relation to decoding the next macroblock of the current video frame. The decoder management component can monitor and track the first subset of quantization-related parameters. The decoder management component can identify or calculate a quantization-related parameter(s) (e.g., actual number of bits spent in relation to coding the current macroblock, the accumulated number of bits used in relation to coding the macroblocks of the current video frame that have been decoded, the accumulated bit spending deficit for the current video frame after the decoding of the current macroblock), which can be part of the first subset.

At 712, a next quantization value can be identified, based at least in part on the first subset of quantization-relation parameters and the second subset of quantization-relation parameters, for use to facilitate decoding the next macroblock of the current video frame. The decoder management component can determine whether the current quantization value, which was used for decoding the current macroblock that was just decoded, is to remain at the same value or whether the quantization value is to be increased or decreased by a defined amount, in relation to decoding the next macroblock.

The decoder management component can determine whether the accumulated bit spending deficit for the current video frame is within the bit deficit threshold range (e.g., less than the bit deficit maximum threshold value, less than the inverse value of the bit surplus maximum threshold). If the accumulated bit spending deficit for the current video frame is within the bit deficit threshold range, the decoder management component can maintain the quantization value at the current value.

If the accumulated bit spending deficit for the current video frame is not within the bit deficit threshold range, the decoder management component can adjust the current quantization value, which was used in relation to decoding the most recently decoded block, to generate a preliminary next quantization value. For example, if the accumulated bit spending deficit for the current video frame is greater than or equal to the bit deficit maximum threshold value, the decoder management component can increase the current quantization value by a defined amount to generate a preliminary next quantization value. If the accumulated bit spending deficit for the current video frame is greater than or equal to the inverse of the bit surplus maximum threshold value, the decoder management component can decrease the current quantization value by a defined amount to generate a preliminary next quantization value.

The decoder management component also can determine whether a preliminary next quantization value is within a quantization value threshold range (e.g., lower than the maximum threshold quantization value, higher than the minimum threshold quantization value). If the decoder management component determines that a preliminary next quantization value is within the quantization value threshold range, the decoder management component can identify that preliminary next quantization value as the next quantization value to be used to decode the next macroblock.

If the decoder management component determines that a preliminary next quantization value is not within the quantization value threshold range, the decoder management component can adjust the quantization value to set it at a desired (e.g., appropriate) threshold quantization value. For example, if the decoder management component determines that a preliminary next quantization value is greater than the maximum threshold quantization value, the decoder management component can adjust the quantization value to set it at the maximum threshold quantization value, which can be used to facilitate decoding the next macroblock. If the decoder management component determines that a preliminary next quantization value is less than the minimum threshold quantization value, the decoder management component can adjust the quantization value to set it at the minimum threshold quantization value, which can be used to facilitate decoding the next macroblock.

At this point, the method 700 can return to reference numeral 706, wherein the next macroblock (e.g., the new current macroblock) can be decoded using the identified quantization value (e.g., the quantization value identified for use in decoding the next macroblock), and the method 700 can proceed from that point.

Referring again to reference numeral 708, if, at 708, it is determined that there are no other macroblocks in the current video frame that remain to be encoded, at 714, the decoded current video frame can be reconstructed based at least in part on the decoded macroblocks of the current video frame. The decoder component can reconstruct the decoded video frame using the decoded macroblocks of the current video frame. At 716, the reconstructed video frame can be provided (e.g., transmitted) to a display component associated with the terminal with which the decoder component is associated. The display component can present (e.g., display) the reconstructed video frame.

At 718, a determination can be made regarding whether there is another video frame of the video frame sequence that remains to be decoded. If, at 718, it is determined that there exists another video frame of the video frame sequence that remains to be decoded, the method 700 can return to reference numeral 702, wherein at least a portion of a second subset of quantization-related parameters can be received in a header (e.g., picture or frame header) associated with that video frame (e.g., the new current video frame). The respective values of the second subset of quantization-related parameters associated with this video frame can be the same as or different from values of the second subset of quantization-related parameters associated with the most recently decoded video frame. The method 700 can proceed from that point. If, at 718, it is determined that there are no other video frames of the video frame sequence that remain to be encoded, at 720, the decoding of the coded video bitstream can end.

Figure 8:
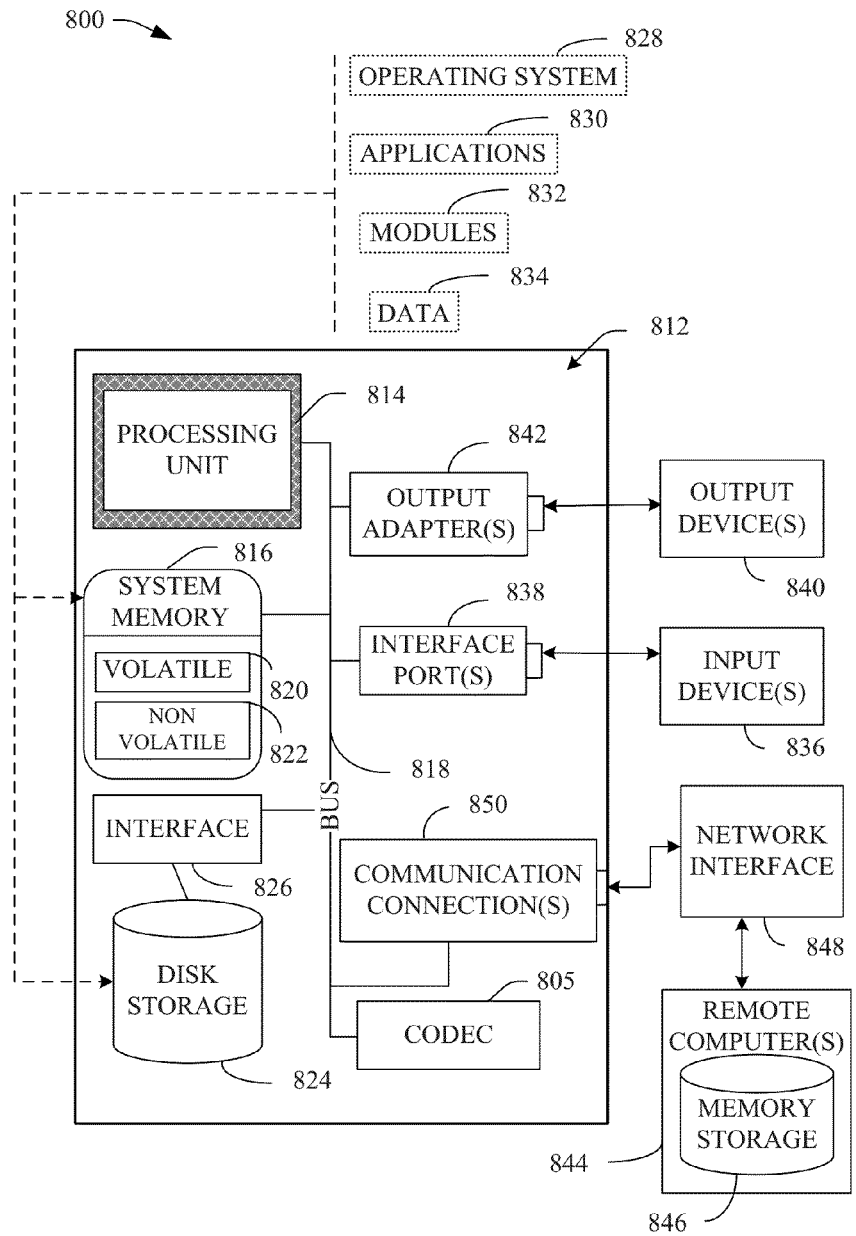
FIG. 8 is a schematic block diagram illustrating a suitable operating environment.
Figure 9:
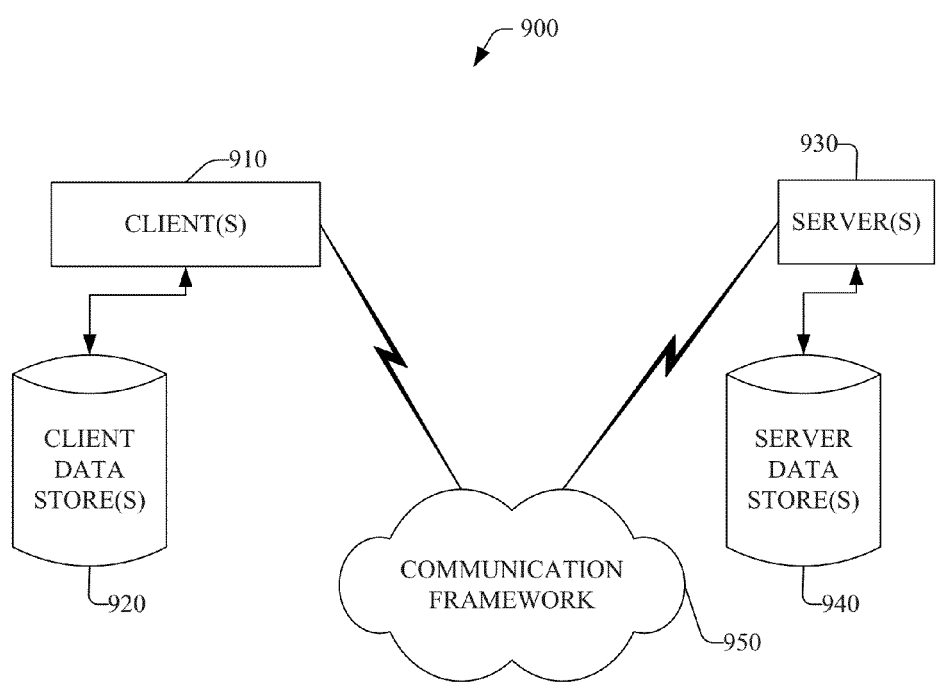
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented.

With reference to FIG. 8, a suitable operating environment 800 for implementing various aspects of this disclosure includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 also includes removable/non-removable, volatile/nonvolatile computer storage media. FIG. 8 illustrates, for example, a disk storage 824. Disk storage 824 includes, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used, such as interface 826.

FIG. 8 also depicts software that acts as an intermediary between users and the basic computer resources described in the suitable operating environment 800. Such software includes, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

In accordance with various aspects and implementations, the computer 812 can be used to encode data, such as digital video data, which can be in the form of a sequence of video frames. As more fully disclosed herein, in some implementations, the computer 812 can include a plurality of processors that can be used to process data and perform computing tasks (e.g., encoding-related tasks and/or decoding-related tasks, etc.). In certain exemplary embodiments, the computer 812 includes a codec 805 that can contain, for example, an encoder component and/or decoder component, each of which can respectively function as more fully disclosed herein. The codec 805 can perform various encoding and/or decoding tasks (e.g., coding video frames, implicitly and/or dynamically controlling quantization values that can be used to facilitate coding a macroblock of a video frame, tracking quantization-related parameters, calculating quantization-related parameters, comparing quantization-related parameters, etc.) on data (e.g., sequentially or in parallel).

FIG. 9 is a schematic block diagram of a sample-computing environment 900 with which the subject matter of this disclosure can interact. The sample-computing environment 900 includes one or more client(s) 910. The client(s) 910 can be hardware and/or software (e.g., threads, processes, computing devices). The sample-computing environment 900 also includes one or more server(s) 930. Thus, sample-computing environment 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing this disclosure, for example. One possible communication between a client 910 and a server 930 may be in the form of a data packet transmitted between two or more computer processes.

The sample-computing environment 900 includes a communication framework 950 that can be employed to facilitate communications between the client(s) 910 and the server(s) 930. The client(s) 910 are operatively connected to one or more client data store(s) 920 that can be employed to store information local to the client(s) 910. Similarly, the server(s) 930 are operatively connected to one or more server data store(s) 940 that can be employed to store information local to the servers 930.

It is to be appreciated and understood that components (e.g., encoder component, codec, decoder component, encoder management component, decoder management component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method for decoding a coded video bitstream, comprising:
    employing at least one processor to facilitate execution of code instructions retained in at least one memory device, the at least one processor, in response to execution of the code instructions, performs acts comprising:
        tracking a first subset of quantization-related parameters during decoding of macroblocks of a current video frame associated with the coded video bitstream; and
        identifying a quantization value for use in facilitating decoding a current macroblock of the current video frame, based at least in part on the first subset of quantization-related parameters and a second subset of quantization-related parameters, to facilitate implicitly controlling quantization values in relation to decoding the current video frame to maintain constant bit rate control in relation to the coded video bitstream, wherein the second subset of quantization-related parameters is obtained from a header that is associated with the current video frame and received with the coded video bitstream;
        tracking a number of bits spent in relation to coding of the current macroblock and an accumulated total number of bits spent in relation to coding of all macroblocks of the current video frame that have been decoded;
        calculating the accumulated total number of bits spent based at least in part on the number of bits spent in relation in relation to coding of the current macroblock;
        calculating an accumulated bit spending deficit associated with the current video frame based at least in part on the accumulated total number of bits spent and an expected number of bits spent to code all of the macroblocks of the current video frame that have been decoded;
        calculating a next quantization value for use in relation to decoding a next macroblock based at least in part on the first subset of quantization-related parameters and the second subset of quantization-related parameters, wherein the first subset of quantization-related parameters comprises the accumulated total number of bits spent and the accumulated bit spending deficit;
        determining whether the accumulated bit spending deficit is less than an inverse of a bit spending surplus threshold level for quantization value decrease; and
        decreasing the quantization value by a specified amount to generate a preliminary next quantization value for use in decoding the next macroblock, in response to determining that the accumulated bit spending deficit is less than the inverse of the bit spending surplus maximum threshold level for quantization value decrease.

2. The method of claim 1, further comprising:
    determining whether the preliminary next quantization value is less than a minimum threshold quantization value associated with the current video frame; and
    at least one of:
        modifying the preliminary next quantization value for the next macroblock to be equal to the minimum threshold quantization value to generate the next quantization value, in response to determining the preliminary next quantization value is less than the minimum threshold quantization value, or
        identifying the next quantization value as being equal to the preliminary next quantization value in response to determining the preliminary next quantization value is not less than the minimum threshold quantization value.

* * * * *